US012067913B2

(12) United States Patent
Park et al.

(10) Patent No.: US 12,067,913 B2
(45) Date of Patent: Aug. 20, 2024

(54) DISPLAY DEVICE AND DISPLAY DEVICE REPAIR METHOD

(71) Applicant: Samsung Display Co., Ltd., Yongin-si (KR)

(72) Inventors: Yongsung Park, Yongin-si (KR); Nam-Hyun Kim, Yongin-si (KR); Sungwoo Jung, Yongin-si (KR); Jieun Choi, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/340,657

(22) Filed: Jun. 23, 2023

(65) Prior Publication Data

US 2024/0054927 A1 Feb. 15, 2024

(30) Foreign Application Priority Data

Aug. 9, 2022 (KR) ........................ 10-2022-0099502

(51) Int. Cl.
*G09G 3/32* (2016.01)
*G09G 3/00* (2006.01)

(52) U.S. Cl.
CPC ............... *G09G 3/006* (2013.01); *G09G 3/32* (2013.01); *G09G 2300/0413* (2013.01); *G09G 2300/0426* (2013.01); *G09G 2300/0819* (2013.01); *G09G 2300/0842* (2013.01); *G09G 2300/0861* (2013.01); *G09G 2320/0233* (2013.01);

(Continued)

(58) Field of Classification Search
CPC .. G09G 3/006; G09G 3/32; G09G 2300/0413; G09G 2300/0426; G09G 2300/0819; G09G 2300/0842; G09G 2300/0861; G09G 2320/0233;

(Continued)

(56) References Cited

U.S. PATENT DOCUMENTS 7,372,680 B2 5/2008 Suh
9,286,832 B2 3/2016 Park et al.

(Continued)

FOREIGN PATENT DOCUMENTS

KR 10-0534583 B1 12/2005
KR 10-0599593 B1 7/2006

(Continued)

*Primary Examiner* — Abdul-Samad A Adediran
(74) *Attorney, Agent, or Firm* — Lewis Roca Rothgerber Christie LLP

(57) ABSTRACT

A display device includes a plurality of pixels, a dummy pixel, and a repair line, wherein the plurality of pixels may include a first subpixel including a first pixel circuit connected with a first initialization voltage line through which a first initialization voltage is provided, and a first light emitting element, and a second subpixel including a second pixel circuit connected with a second initialization voltage line through which a second initialization voltage different from the first initialization voltage is provided, and a second light emitting element, wherein the dummy pixel may include a first transistor connectable with the repair line and connected with the first initialization voltage line, a second transistor connectable with the repair line and connected with the second initialization voltage line, and a dummy pixel circuit connectable with the repair line.

20 Claims, 19 Drawing Sheets

(52) U.S. Cl.
CPC . *G09G 2320/0242* (2013.01); *G09G 2330/08* (2013.01); *G09G 2330/12* (2013.01)

(58) Field of Classification Search
CPC ....... G09G 2320/0242; G09G 2330/08; G09G 2330/12; G09G 3/3233; G09G 3/3291
USPC .......................................................... 345/78
See application file for complete search history.

(56) References Cited

U.S. PATENT DOCUMENTS

2015/0294618 A1* 10/2015 Park ..................... G09G 3/3291 345/78
2021/0280130 A1* 9/2021 Wang ................... G09G 3/3233

FOREIGN PATENT DOCUMENTS

| | | | |
|---|---|---|---|
| KR | 10-2057584 | B1 | 12/2019 |
| KR | 10-2152950 | B1 | 9/2020 |
| KR | 10-2021-0111945 | A | 9/2021 |

* cited by examiner

DISPLAY DEVICE AND DISPLAY DEVICE REPAIR METHOD

CROSS-REFERENCE TO RELATED APPLICATION

The present application claims priority to and the benefit of Korean Patent Application No. 10-2022-0099502, filed on Aug. 9, 2022, in the Korean Intellectual Property Office, the entire content of which is incorporated herein by reference.

BACKGROUND

1. Field

Aspects of some embodiments of the present disclosure relate to a display device capable of repairing a defective pixel using a dummy pixel and a repair line, and a display device repair method.

2. Description of Related Art

A defective pixel may occur in a manufacturing process of a display device. The defective pixel may cause a bright spot at which the pixel is always in an emission state, or a dark spot at which the pixel is always in a non-emission state. It therefore may be desirable to repair such a defective pixel to increase a yield of the display device. Because the display device may have a relatively complex pixel circuit and a relatively complicated manufacturing process, the yield may be reduced due to the defective pixel, as the size and resolution increase.

The above information disclosed in this Background section is only for enhancement of understanding of the background and therefore the information discussed in this Background section does not necessarily constitute prior art.

SUMMARY

Aspects of some embodiments of the present disclosure provides a display device in which a defective pixel is repairable, and a display device repair method.

According to some embodiments of the inventive concept, a display device includes: a plurality of pixels in a display area; a dummy pixel in a dummy area adjacent to the display area; and a repair line connectable with the dummy pixel and each of the plurality of pixels, wherein the plurality of pixels include: a first subpixel including a first pixel circuit connected with a first initialization voltage line through which a first initialization voltage is provided, and a first light emitting element adjacent to the first pixel circuit and configured to emit first light; and a second subpixel including a second pixel circuit connected with a second initialization voltage line through which a second initialization voltage different from the first initialization voltage is provided, and a second light emitting element adjacent to the second pixel circuit and configured to emit second light different from the first light, and wherein the dummy pixel includes: a first transistor connectable with the repair line and connected with the first initialization voltage line; a second transistor connectable with the repair line and connected with the second initialization voltage line; and a dummy pixel circuit connectable with the repair line.

According to some embodiments, the repair line may be connected with the second initialization voltage line.

According to some embodiments, each of the first pixel circuit, the second pixel circuit, and the dummy pixel circuit may include: a driving transistor connected between the first light emitting element and a driving voltage line receiving a driving voltage; a switching transistor connected between a data line and a first electrode of the driving transistor, and configured to receive a first scan signal; a compensation transistor connected between a second electrode of the driving transistor and a first node, and configured to receive a compensation scan signal; and an initialization transistor connected between the first node and an initialization voltage line provided with an initialization voltage, and configured to receive an initialization scan signal, wherein the first pixel circuit further comprises a first initialization transistor connected between the first initialization voltage line and an anode of the first light emitting element, and configured to receive a second scan signal, and the second pixel circuit further comprises a second initialization transistor connected between the second initialization voltage line and an anode of the second light emitting element, and configured to receive the second scan signal.

According to some embodiments, the driving transistor, the switching transistor, the first initialization transistor, the second initialization transistor, the first transistor, and the second transistor may be P-type transistors, and the compensation transistor and the initialization transistor may be N-type transistors.

According to some embodiments, the dummy area may be provided in plural, and the plurality of dummy areas may be spaced apart from each other with the display area interposed therebetween.

According to some embodiments, when the first pixel circuit is defective, an anode of the first light emitting element may be electrically connected with the dummy pixel circuit and the first transistor, and the anode of the first light emitting element may be insulated from the first pixel circuit and the second transistor.

According to some embodiments, when the second pixel circuit is defective, the anode of the second light emitting element may be electrically connected with the dummy pixel circuit and the second transistor, and an anode of the second light emitting element may be insulated from the second pixel circuit and the first transistor.

According to some embodiments, the first light may be red light, and the second light may be blue light or green light.

According to some embodiments, the first initialization voltage may have a lower level than the second initialization voltage.

According to some embodiments, the plurality of pixels and the dummy pixel may be arranged in a first direction.

According to some embodiments, the first transistor and the second transistor may be adjacent to the dummy pixel circuit.

According to some embodiments of the inventive concept, a display device repair method includes: providing a display device comprising a plurality of pixels, a dummy pixel, and a repair line adjacent to the dummy pixel and each of the plurality of pixels; detecting a defect of each of the plurality of pixels; and repairing at least one of the plurality of pixels, wherein the plurality of pixels include: a first subpixel comprising a first pixel circuit connected with a first initialization voltage line through which a first initialization voltage is provided, and a first light emitting element adjacent to the first pixel circuit and configured to emit first light; and a second subpixel comprising a second pixel circuit connected with a second initialization voltage line through which a second initialization voltage different from the first initialization voltage is provided, and a second light emitting element adjacent to the second pixel circuit and configured to emit second light different from the first light, and wherein the dummy pixel includes: a first transistor connectable with the repair line and connected with the first initialization voltage line; a second transistor connectable with the repair line and connected with the second initialization voltage line; and a dummy pixel circuit connectable with the repair line.

According to some embodiments, the repair line may be connected with the second initialization voltage, and the repairing at least one of the plurality of pixels may include open-circuiting the repair line and the second initialization voltage line, when one of the plurality of pixels is defective.

According to some embodiments, in the providing a display device, the repair line may be adjacent to the dummy pixel circuit, the first transistor, the second transistor, the first pixel, and the second pixel, and be open-circuited therefrom, and when the first pixel is determined defective in the detecting a defect of each of the plurality of pixels, the repairing at least one of the plurality of pixels may include repairing the first pixel, wherein the repairing the first pixel may include: electrically open-circuiting the first pixel circuit from the first light emitting element; and electrically short-circuiting the repair line with the dummy pixel circuit, the first transistor, and the first light emitting element.

According to some embodiments, when the second pixel is determined defective in the detecting a defect of each of the plurality of pixels, the repairing may include repairing the second pixel, wherein the repairing the second pixel includes: electrically open-circuiting the second pixel circuit from the second light emitting element; and electrically short-circuiting the repair line with the dummy pixel circuit, the second transistor, and the second light emitting element.

According to some embodiments, each of the first pixel circuit and the second pixel circuit may include: a driving transistor connected between the first light emitting element and a driving voltage line receiving a driving voltage; a switching transistor connected between a data line and a first electrode of the driving transistor and configured to receive a first scan signal; a compensation transistor connected between and a first node and a second electrode of the driving transistor, and configured to receive a compensation scan signal; and an initialization transistor connected between the first node and an initialization voltage line provided with an initialization voltage, and configured to receive an initialization scan signal, the first pixel circuit may further include a first initialization transistor connected between the first initialization voltage line and an anode of the first light emitting element, and configured to receive a second scan signal, and the second pixel circuit may further include a second initialization transistor connected between the second initialization voltage line and an anode of the second light emitting element, and configured to receive the second scan signal, wherein the electrically open-circuiting the first pixel circuit from the first light emitting element includes: short-circuiting the driving transistor, the compensation transistor, and the first light emitting element; and short-circuiting the first light emitting element and the first initialization transistor.

According to some embodiments, in the providing a display device, the repair line may be electrically connected with the dummy pixel circuit, the repair line may be adjacent to each of the first transistor, the second transistor, the first pixel, and the second pixel and be open-circuited therefrom, and when the first pixel is determined defective in the detecting a defect of each of the plurality of pixels, the repairing at least one of the plurality of pixels may include: electrically open-circuiting the first pixel circuit from the first light emitting element; and electrically short-circuiting the repair line with the first transistor and the first light emitting element.

According to some embodiments, when the second pixel is determined defective in the detecting a defect of each of the plurality of pixels, the repairing at least one of the plurality of pixels may include: electrically open-circuiting the second pixel circuit from the second light emitting element electrically open-circuited; and electrically short-circuiting the repair line with the first transistor and the first light emitting element.

According to some embodiments, in the providing a display device, the repair line may be electrically connected with the dummy pixel circuit and the second transistor, the repair line may be adjacent to each of the first transistor, the first pixel, and the second pixel and be open-circuited therefrom, and when the first pixel is determined defective in the detecting a defect of each of the plurality of pixels, the repairing at least one of the plurality of pixels may include: electrically open-circuiting the first pixel circuit from the first light emitting element; electrically open-circuiting the repair line from the second transistor open-circuited; and electrically short-circuiting the repair line with the first transistor and the first light emitting element, and when the second pixel is determined defective in the detecting a defect of each of the plurality of pixels, the repairing at least one of the plurality of pixels may include: electrically open-circuiting the second pixel circuit from the second light emitting element; and electrically short-circuiting the repair line with the second light emitting element.

According to some embodiments, in the providing a display device, the repair line may be electrically connected with the dummy pixel circuit and the first transistor, the repair line may be adjacent to each of the second transistor, the first pixel, and the second pixel, and be open-circuited therefrom, when the first pixel is determined defective in the detecting a defect of each of the plurality of pixels, the repairing at least one of the plurality of pixels may include: electrically open-circuiting the first pixel circuit from the first light emitting element; and electrically short-circuiting the repair line with the first light emitting element, and when the second pixel is determined defective in the detecting a defect of each of the plurality of pixels, the repairing at least one of the plurality of pixels may include: electrically open-circuiting the second pixel circuit from the second light emitting element; and electrically open-circuiting the repair line from the first transistor; and electrically short-circuiting the repair line with the second transistor and the second light emitting element.

BRIEF DESCRIPTION OF THE DRAWINGS

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
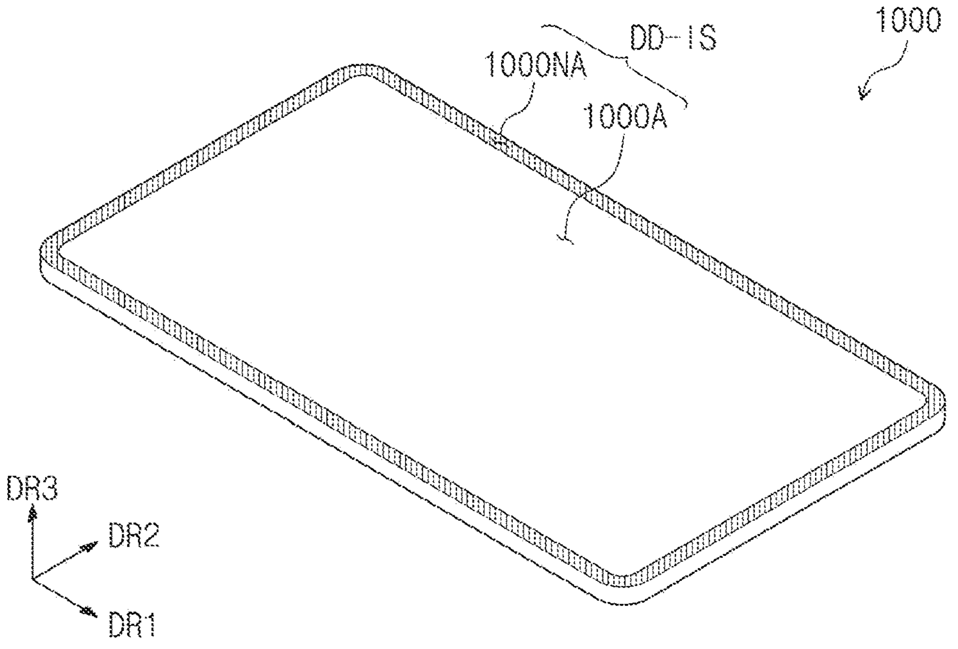
FIG. 1 is a perspective view of a display device according to some embodiments of the inventive concept.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

Like numerals refer to like elements throughout. In addition, in the drawings, the thickness, the ratio and the dimension of the element are exaggerated for effective description of the technical contents. The term "and/or" includes any and all combinations of one or more of the associated items.

Terms such as first, second, and the like may be used to describe various components, but these components should not be limited by the terms. These terms are only used to distinguish one element from another. For instance, a first component may be referred to as a second component, or similarly, a second component may be referred to as a first component, without departing from the scope of the present disclosure. The singular expressions include plural expressions unless the context clearly dictates otherwise.

In addition, the terms such as "under", "lower", "on", and "upper" are used for explaining associations of items illustrated in the drawings. It will be understood that the spatially relative terms are intended to encompass different orientations of the device in use or operation in addition to the orientation depicted in the figures.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. In addition, it will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Hereinafter, aspects of some embodiments of the inventive concept will be described in more detail with reference to the accompanying drawings.

FIG. 1 is a perspective view of a display device according to some embodiments of the inventive concept.

Referring to FIG. 1, the display device 1000 may be a device activated in response to an electrical signal. For example, the display device 1000 may be a mobile phone, a tablet, a vehicle navigator, a game player, a wearable device, or a monitor, but is not particularly limited thereto.

The display device 1000 may display an image through a display surface DD-IS. The display surface DD-IS is parallel to a surface defined by a first direction DR1 and a second direction DR2. The top surface of a member located on the most top side of the display device 1000 may be defined as the display surface DD-IS. The normal direction of the display surface DD-IS, namely, the thickness direction of the display device 1000 may indicate a third direction DR3. In the description below, the front surfaces (or top surfaces) and the rear surfaces (or bottom surfaces) of respective layers or units may be divided by the third direction DR3.

A display area 1000A and a non-display area 1000NA may be defined in the display device 1000. The non-display area 1000NA may be the peripheral area of the display area 1000A. The display device 1000 may display an image through the display area 1000A. The non-display area 1000NA may surround the display area 1000A. The non-display area 1000NA according to some embodiments of the inventive concept may be omitted or located only in one side of the display area 1000A. FIG. 1 illustrates an example planar display device 1000, but the display device 1000 may have a covered shape.

Figure 2:
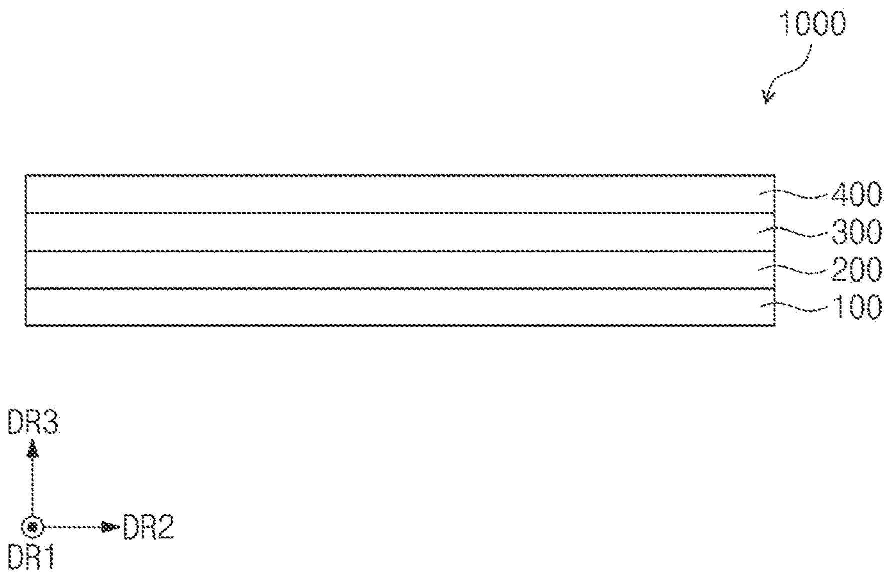
FIG. 2 is a schematic cross-sectional view of a display device according to some embodiments of the inventive concept.

FIG. 2 is a schematic cross-sectional view of a display device according to some embodiments of the inventive concept.

Referring to FIG. 2, the display device 1000 may include a display panel 100, a sensor layer 200, an optical film 300, and a window 400. According to some embodiments of the inventive concept, some of the aforementioned components may be omitted or other components may be further added. An adhesive layer may be located between the members as necessary. The adhesive layer may be an Optically Clear Adhesive (OCA), or a Pressure Sensitive Adhesive (PSA) film, but is not particularly limited thereto. Adhesive layers to be described below may also include the same material as that or a typical adhesive.

The display panel 100 may be a component configured to substantially generate an image. The display panel 100 may be an emissive display panel, for example, an organic light emitting display panel, an inorganic light emitting display panel, an organic-inorganic display panel, a quantum dot display panel, a micro LED display panel, or a nano LED display panel.

The sensor layer 200 may be located on the display panel 100. The sensor layer 200 may sense an external input applied from the outside. The external input may be a user input. The user input may include various types of external inputs such as a part of the user's body, light, heat, a pen, pressure or the like.

The sensor layer 200 may be located on the display panel 100 through continuous processes. In this case, the sensor layer 200 may be represented as being directly located on the display panel 100. Being directly located may mean that a third element is not located between the sensor layer 200 and the display panel 100. In other words, a separate adhesive member may not be located between the sensor layer 200 and the display panel 100. Alternatively, the sensor layer 200 may be coupled with the display panel 100 through an adhesive member. The adhesive member may include a typical adhesive or a pressure sensitive adhesive. According to some embodiments of the inventive concept, the sensor layer 200 may be omitted.

The optical film 300 may reduce the reflectance of the light that is incident externally. The optical film 300 may include a phase retarder and/or a polarizer. The optical film 300 may be referred to as a polarization film. The optical film 300 may be attached to the optical film 200 through the adhesive layer.

Alternatively, the optical film 300 may include color filters. The color filters may have a prescribed array. The array of the color filters may be determined in consideration of light emission colors of pixels included in the display panel 100. In addition, the optical film 300 may further include a black matrix adjacent to the color filters.

Alternatively, the optical film 300 may include a destructive interference structure. For example, the destructive interference structure may include a first reflection layer and a second reflection layer located on different layers. First reflection light and second reflection light respectively reflected by the first reflection layer and the second reflection layer may destructively interfere with each other, and thus an external light reflection ratio may be reduced.

The window 400 may be located on the optical film 300. The window 400 may include an optically transparent insulation material. For example, the window 400 may include glass or plastic. The window 400 may have a multilayer structure or a single-layer structure. For example, the window 400 may include a plurality of plastic films bonded with an adhesive, or a glass substrate and a plastic film bonded with an adhesive.

Figure 3:
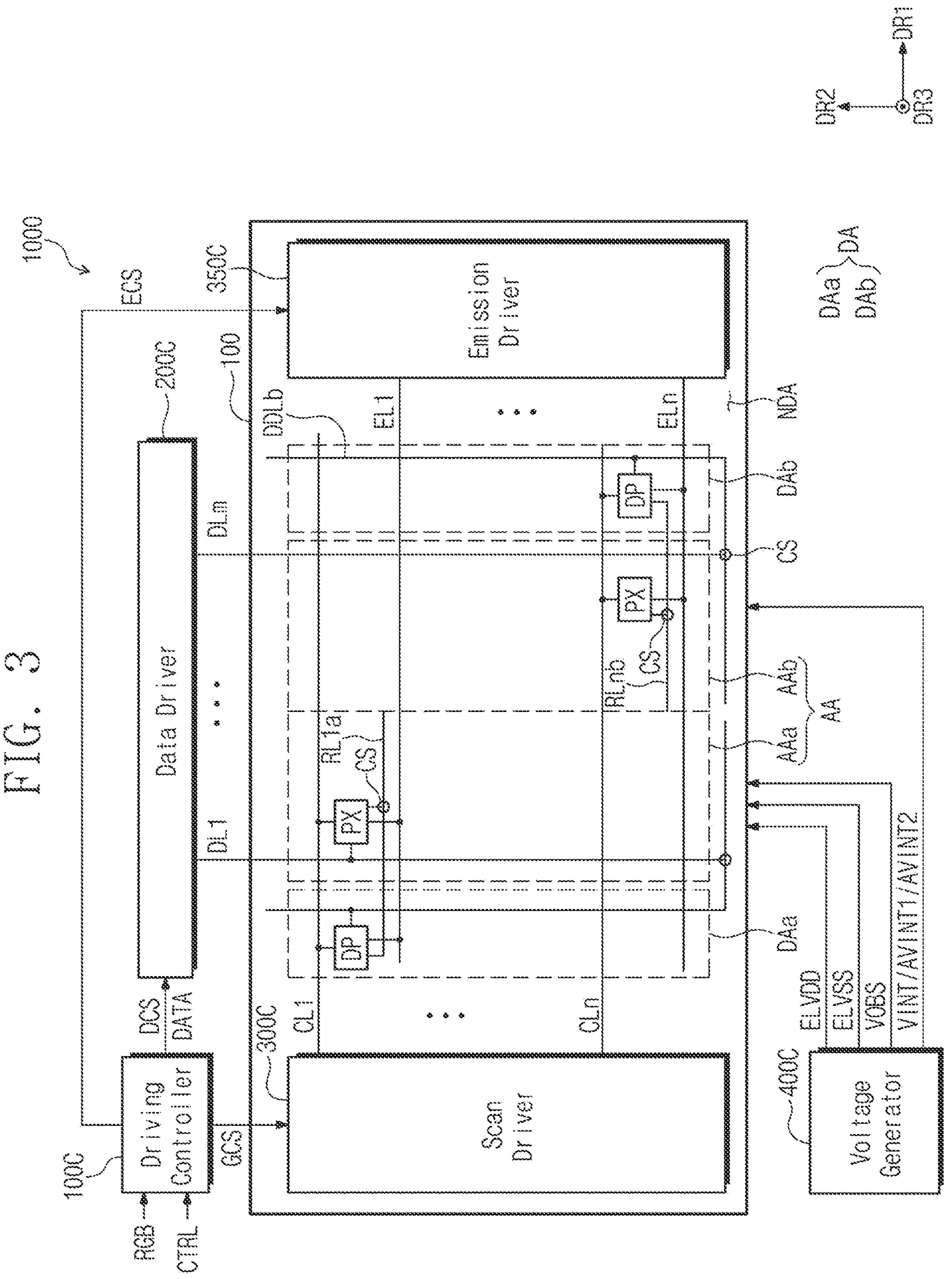
FIG. 3 is a block diagram of a display device according to some embodiments of the inventive concept.

FIG. 3 is a block diagram of a display device according to some embodiments of the inventive concept.

Referring to FIG. 3, the display device 1000 may further include a panel driver and a driving controller 100C.

The panel driver may include a data driver 200C, a scan driver 300C, an emission driver 350C, and a voltage generator 400C.

The driving controller 100C may receive an image signal RGB and a control signal CTRL. The driving controller 100C may generate an image data signal DATA converted from the data format of the image signal RGB so as to match the specification of an interface with the data driver 200C. The driving controller 100C may output a first control signal GCS, a second control signal ECS, and a third control signal DCS.

The data driver 200C may receive the third control signal DCS and the image data signal DATA from the driving controller 100C. The data driver 200C may convert the image data signal DATA into data signals, and outputs the data signals to a plurality of data lines DL1 to DLm to be described below. The data signals are analog voltages corresponding to grayscale values of the image data signal DATA. Each of the plurality of data lines DL1 to DLm may extend in the second direction DR2. The plurality of data lines DL1 to DLm may be spaced apart from each other in the first direction DR1.

The scan driver 300C may receive the first control signal GCS from the driving controller 100C. The scan driver 300C may output scan signals to the plurality of scan lines CL1 to CLn in response to the first control signal GCS. Each of the plurality of scan lines CL1 to CLn may extend in the second direction DR2. The plurality of scan lines CL1 to CLn may be spaced apart from each other in the second direction DR2.

The emission driver 350C may receive the second control signal ECS from the driving controller 100C. The emission driver 350C may output emission control signals to the plurality of emission control lines EL1 to ELn in response to the second control signal ECS. Each of the plurality of emission control lines EL1 to ELn may extend in the first direction DR1. The emission control lines EL1 to ELn may be spaced apart from each other in the second direction DR2. Alternatively, the scan diver 300C may be connected to the plurality of emission lines Ell to ELn. In this case, the scan driver 300C may output the emission control signals to the plurality of emission control lines EL1 to ELn.

The voltage generator 400C may generate voltages required for operating the display panel 100. According to some embodiments, the voltage generator 400C may generate a first driving voltage ELVDD, a second driving voltage ELVSS, an initialization voltage VINT, a first initialization voltage AVINT1, a second initialization voltage AVINT2, and a bias voltage VOBS.

The display panel 100 may include a plurality of pixels PX, a plurality of dummy pixels DP, a plurality of dummy data lines DDLa and DDLb, and a plurality of repair lines RL1*a* to RLnb. FIG. 3 only illustrates two example pixels PX and two example dummy pixels DP. In the display panel 100, a display area AA formed with the plurality of pixels PX, at least one dummy area DA formed with the dummy pixels DP, and a non-display area NDA adjacent to the display area AA and the dummy area DA. The non-display area NDA may be an area corresponding to the non-display area 1000NA (see FIG. 1) of the display device 1000 (see FIG. 1).

The display area AA may be an area in which an image is displayed through controlled emission from the plurality of pixels PX. The display area AA may include a first sub-display area AAa and a second sub-display area AAb.

The plurality of pixels PX may be electrically connected to the plurality of scan lines CL1 to CLn, the plurality of data lines DL1 to DLm, and the plurality of emission control lines EL1 to ELn.

The dummy area DA may be located adjacent to the display area AA. The dummy area DA may be located in at least one of the left, the right, the upper side, or the lower side of the display area AA. FIG. 3 illustrates that an example dummy area DA is located in the right and the left of the display area AA. The dummy area DA may include the first sub-dummy area DAa and the second sub-dummy area DAb. The first sub-dummy area DAa and the second sub-dummy area DAb may be spaced apart from each other in the first direction DR1 with the display area AA interposed therebetween.

The first sub-dummy area DAa may be located adjacent to the first sub-display area AAa. The second sub-dummy area DAb may be located adjacent to the second sub-display area AAb.

The plurality of dummy pixels DP may be electrically connected to the plurality of dummy data lines DDLa and DDLb, the plurality of scan lines CL1 to CLn, and the plurality of emission control lines EL1 to ELn. The plurality of dummy data lines DDLa and DDLb may include a first dummy data line DDLa and a second dummy data line DDLb. In the first sun-dummy area DAa, the first dummy data line DDLa and the plurality of dummy pixels DP electrically connected thereto may be arranged along the second direction DR2. In the second sun-dummy area DAb, the second dummy data line DDLb and the plurality of dummy pixels DP electrically connected thereto may be arranged along the second direction DR2.

The first dummy data line DDLa may include a first part connected to each of the dummy pixels DP in the first sub-dummy area DAa and a second part located connectable to data lines connected to the pixels PX in the first sub-display area AAa corresponding to the first sub-dummy area DAa.

The second dummy data line DDLb may include a first part connected to each of the dummy pixels DP in the second sub-dummy area DAb and a second part arranged to be connectable to data lines connected to the pixels PX in the second sub-display area AAb corresponding to the second sub-dummy area DAb.

The first parts of the first dummy data line DDLa and the second dummy data line DDLb may be respectively located in the first sub-dummy area DAa and the second sub-dummy area DAb. The second parts of the first dummy data line DDLa and the second dummy data line DDLb may be located in the non-display area NDA. The non-display area NDA and the dummy area DA may be referred to as a dead space.

The plurality of repair lines RL1*a* and RLnb may include a first repair line RL1*a* and a second repair line RLnb. The first repair line RL1*a* may be arranged to be connectable to the dummy pixels DP located in the first sub-dummy area DAa and the pixels PX located in the first sub-display area AAa. The second repair line RL1*b* may be arranged to be connectable to the dummy pixels DP located in the second sub-dummy area DAb and the pixels PX located in the second sub-display area AAb.

In the specification, a term "connectable" may mean a state of being capable of being connected using a laser or the like in a repair process. For example, that a first conductor and a second conductor are arranged to be connectable may mean that the first conductor and the second conductor are actually electrically insulated but are in a state of being capable of being connected to each other in the repair process. From a structural view, the first conductor and the second conductor, which are "connectable to each other", may be arranged so as to at least partially overlap each other with an insulation layer interposed therebetween in an overlapping area. When laser light is emitted to the overlapping area in the repair process, the insulation layer in the overlapping area may be broken down and the first and second conductors may be electrically connected to each other. Here, the first and second conductors may be referred to as being electrically shorted.

In the drawings accompanied herein, in order to facilitate noticing the first conductor and the second conductor "connectable" to each other, an intersection point of the first and second conductors is indicated with a white circle as a connectable structure CS.

In addition, a term "separable" or "separably" may mean a state of being capable of being separated using a laser or the like in the repair process. For example, that a first member and a second member are separably connected may mean that the first member and the second member are actually electrically connected to each other, but are in a state where the first and second members are to be separated and electrically insulated from each other in the repair process. The first and second members separably connected in a structural view may be arranged to be connected through a conductive connection member. When the laser light is emitted to the conductive connection member in the repair process, a portion, emitted with the laser light, of the conductive connection member is melted and is cut off to make the first and second members be electrically insulated. Here, the first and second conductors may be referred to as being electrically open-circuited. For example, the conductive connection member may include a silicon layer that may be melted by the laser light.

The scan driver 300C may provide scan signals to the plurality of pixels PX and the plurality of dummy pixels DP through the scan lines CL1 to CLn. The data driver 200C may provide data signals to the plurality of pixels PX through the data linesC DL1 to DLm.

The pixel PX connected to the scan line CL1 and the data line DL1 may be connected to the first repair line RL1*a* through the connectable structure CS. In addition, the data line DL1 and the first dummy data line DDLa may also be connected through the connectable structure CS. In other words, the data line DL1 and the first dummy data line DDLa are actually electrically insulated, but when the laser light is emitted to the connectable structure CS in the repair process, the data line DL1 and the first dummy data line DDLa may be electrically connected to each other.

The pixel PX connected to the scan line CLn and the data line DLm may be connected to the second repair line RL1*b* through the connectable structure CS. In addition, the data line DLm and the second dummy data line DDLb may also be connected through the connectable structure CS.

According to some embodiments of the inventive concept, to one pixel row defined by a plurality of pixels PX arranged in the first direction DR1 in the first sub-display area AAa, one dummy pixel DP in the first sub-dummy area DAa may be electrically connected. In other words, in the first sub-dummy area DAa, only one dummy pixel column, which includes dummy pixels DP arranged in the second direction DR2, may be defined. The display device 1000 may repair the plurality of pixels PX using the one dummy pixel column. Accordingly, the display device 1000 with a reduced area of the dead space may be provided.

The plurality of pixels PX may be arranged with two dummy pixels DP interposed therebetween in the first direction DR1.

One pixel PX for each of the sub-display areas AAa and AAb may be repaired using dummy pixels DP arranged in the sub-dummy areas DAa and DAb respectively corresponding to the sub-dummy areas DAa and DAb.

Figure 4:
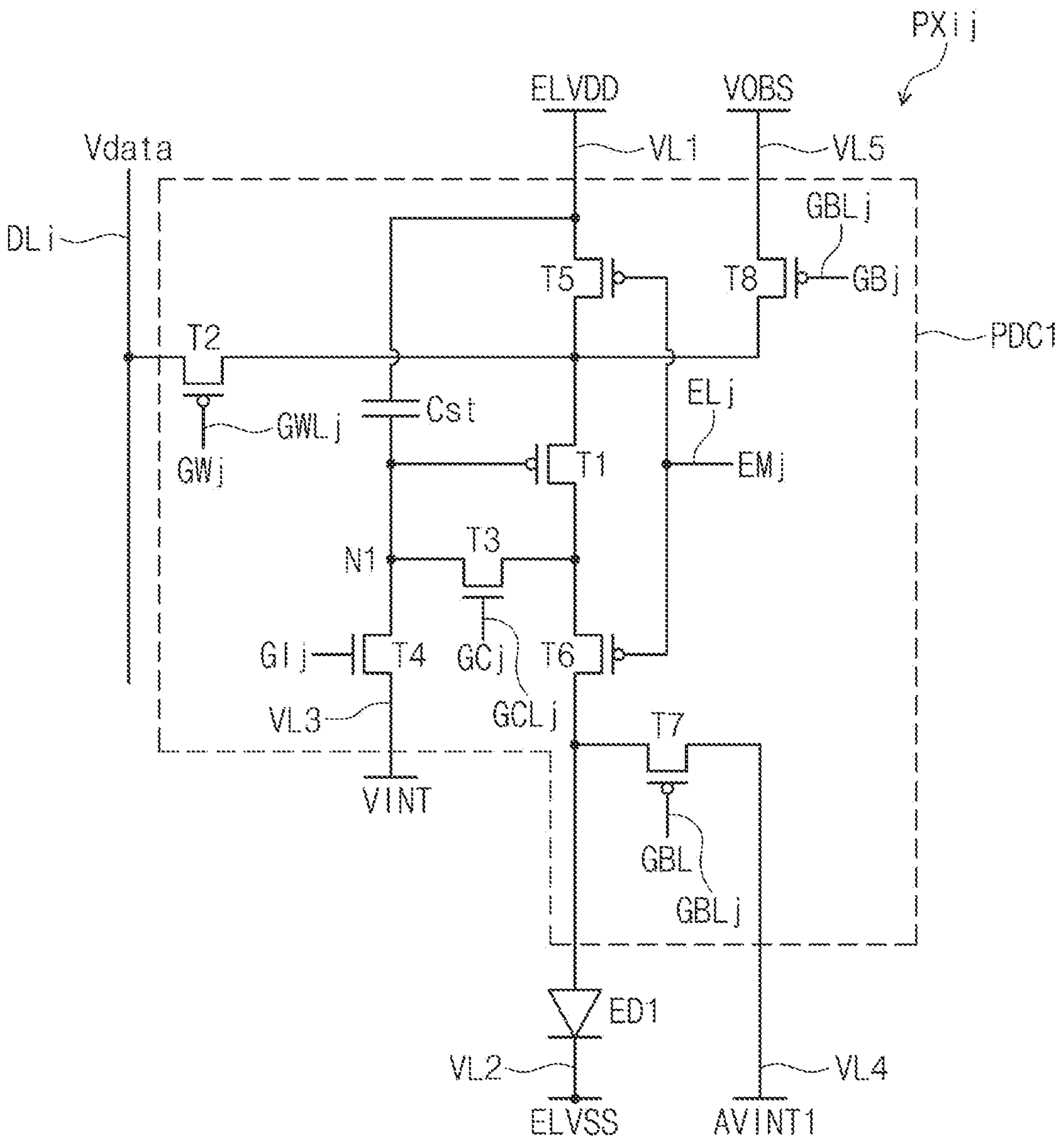
FIG. 4 is an equivalent circuit diagram of a pixel according to some embodiments of the inventive concept.

FIG. 4 is an equivalent circuit diagram of a pixel according to some embodiments of the inventive concept.

The plurality of pixels PX (see FIG. 3) may include a plurality of sub-pixels configured to respectively display a plurality of colors so as to display various colors. For example, the plurality of pixels PX (see FIG. 3) may include a first sub-pixel configured to emit first light, a second sub-pixel configured to emit second light that is different from the first light, and a third sub-pixel configured to emit third light that is different from the first light and the second light. Description thereabout will be provided below. FIG. 4 illustrates an example equivalent circuit diagram of one first sub-pixel PXij among the plurality of pixels PX (see FIG. 3).

Referring to FIGS. 3 and 4, the plurality of scan lines CL1 to CLn may include a plurality of initialization scan lines, a plurality of compensation scan lines, a plurality of first scan lines, and a plurality of second scan lines.

The first sub-pixel PXij may be connected to an i-th data line DLi among the plurality of data lines DL1 to DLm, a j-th initialization scan line GILj among the plurality of initialization scan lines, a j-th compensation scan line GCLj among the plurality of compensation scan lines, a j-th first scan line GWLj among the plurality of first scan lines, a j-th second scan line GBLj among the plurality of second scan lines, and a j-th emission control line ELj among the emission control lines EL1 to ELn.

The first sub-pixel PXij may include a first light emitting element ED1 and a first pixel circuit PDC1. The first light emitting element ED1 may be a light emitting diode. According to some embodiments of the inventive concept, the first light emitting element ED1 may be an organic light emitting diode including an organic light emitting layer.

The first pixel circuit PDC may include a plurality of transistors T1, T2, T3, T4, T5, T6, T7 and T8, and a storage capacitor Cst. The plurality of transistors T1, T2, T3, T4, T5, T6, T7 and T8 may include a driving transistor T1, a switching transistor T2, a compensation transistor T3, an initialization transistor T4, an operation control transistor T5, an emission control transistor T6, a first initialization transistor T7, and a bias transistor T8.

Some of the plurality of transistors T1, T2, T3, T4, T5, T6, T7 and T8 may be P-type transistors, and the remainder are N-type transistors. For example, the driving transistor T1, the switching transistor T2, the operation control transistor T5, the emission control transistor T6, the first initialization transistor T7, and the bias transistor T8 are PMOS transistors. The compensation transistor T3 and the initialization transistor T4 are NMOS transistors.

At least one of the plurality of transistors T1, T2, T3, T4, T5, T6, T7, or T8 may be a transistor with low-temperature polycrystalline silicon (LTPS) semiconductor layer, and at least one of the plurality of transistors T1, T2, T3, T4, T5, T6, T7, or T8 may be a transistor with an oxide semiconductor layer.

For example, for the driving transistor T1, which is configured to directly influence the brightness of the display device, may include a semiconductor layer composed of highly reliable polycrystalline silicon, and through this, a display device of high resolution may be implemented.

Meanwhile, the oxide semiconductor has a high carrier mobility and a low leakage current, and thus a voltage drop is not large despite of a long driving time. In other words, a change in color of an image according to the voltage drop is not large even during low frequency driving, and thus low frequency driving is possible. In this way, because the oxide semiconductor may have a relatively lower leakage current, the oxide semiconductor may be adopted to at least one of the compensation transistor T3 or the initialization transistor T4 connected to a driving gate of the driving transistor T1, and thus the leakage current, which may flow to a driving gate electrode, may be prevented or reduced and power consumption may also be reduced.

In other words, the driving transistor T1, the switching transistor T2, the operation control transistor T5, the emission control transistor T6, the first initialization transistor T7, and the bias transistor T8 may be transistors having LTPS semiconductor layers, and the compensation transistor T3 and the initialization transistor T4 may be transistors having oxide semiconductor layers.

The configuration of the first pixel circuit PDC1 according to some embodiments of the inventive concept is not limited to the embodiments shown in FIG. 4. The first pixel circuit PDC1 shown in FIG. 4 is just an example, and the configuration of the first pixel circuit PDC1 may be modified. For example, all the plurality of transistors T1, T2, T3, T4, T5, T6, T7 and T8 may be the P-type transistors or the N-type transistors.

The j-th initialization scan line GILj, the j-th compensation scan line GCLj, the j-th scan line GWLj, the j-th second scan line GBLj, and the j-th emission control line ELj may respectively transfer, to a j-th initialization scan signal GIj, a j-th compensation scan signal GCj, a j-th first scan signal GWj, a j-th second scan signal GBj, and a j-th emission control signal EMj. The i-th data line DLi transfers an i-th data signal Di to the first sub-pixel PXij. The i-th data signal Di may have a voltage level corresponding to the image signal RGB input to the display device 1000.

A first driving voltage line VL1 and a second driving voltage line VL2 may respectively transfer the first driving voltage ELVDD and the second driving voltage ELVSS to the first sub-pixel PXij.

The driving transistor T1 may be connected between the first light emitting element ED1 and the first driving voltage line VL1 configured to receive the first driving voltage ELVDD. The driving transistor T1 may include a first electrode connected with the first driving voltage line VL1 via the operation control transistor T5, a second electrode electrically connected to an anode of the first light emitting element ED1 via the emission control transistor T6, and a third electrode connected to one end of the storage capacitor Cst. The driving transistor T1 may receive an i-th data signal Vdata transferred through the i-th data line DLi in response to a switching operation of the switching transistor T2 and supply a driving current to the first light emitting elements ED1.

The switching transistor T2 may be connected between the data line DLi and the first electrode of the driving transistor T1. The switching transistor T2 may include a first electrode connected with the data line DLi, a second electrode connected to the first electrode of the driving transistor T1, and a third electrode connected with the j-th first scan line GWLj. The switching transistor T2 may be turned on in response to the first scan signal GWj transferred through the j-th first scan line GWLj to transfer the data signal Vdata transferred from the i-th data line DLi to the first electrode of the driving transistor T1.

The compensation transistor T3 may be connected between the second electrode of the driving transistor T1 and the first node N1. The compensation transistor T3 may include a first electrode connected with the third electrode of the driving transistor T1, a second electrode connected with the second electrode of the driving transistor T1, and a third electrode connected with the j-th compensation scan line GCLj. The compensation transistor T3 may be turned on in response to the j-th compensation scan signal GCj transferred through the j-th compensation scan line GCLj to connect the third electrode and the second electrode of the driving transistor T1, and thus the driving transistor T1 may be diode-connected.

The initialization transistor T4 may be connected between the initialization voltage line VL3 applied with the initialization voltage VINT and the first node N1. The initialization transistor T4 may include a first electrode connected with the third electrode of the driving transistor T1, a second electrode connected with the initialization voltage line VL3 through which the initialization voltage VINT is transferred, and a third electrode connected with the j-th second scan line GILj. The initialization transistor T4 may be turned on in response to the j-th second scan signal GIj transferred through the j-th second scan line GILj. The turned-on initialization transistor T4 may transfer the initialization voltage VINT to the third electrode of the driving transistor T1 to initialize, to a prescribed voltage, the potential (namely, the potential at the first node N1) of the third electrode of the driving transistor T1.

The operation control transistor T5 may include a first electrode connected with the first driving voltage line VL1, a second electrode connected with the first electrode of the driving transistor T1, and a third electrode connected with the j-th emission control line ELj.

The emission control transistor T6 may include a first electrode connected with the second electrode of the driving transistor T1, a second electrode connected with the anode of the first light emitting element ED1, and a third electrode connected with the j-th emission control line ELj.

The operation control transistor T5 and the emission control transistor T6 may be substantially simultaneously turned on in response to the j-th emission control signal EMj. The first driving voltage ELVDD applied through the turned-on operation control transistor T5 may be compensated through the diode-connected driving transistor T1 and then transferred to the first light emitting element ED1.

The first initialization transistor T7 may include a first electrode connected to the first initialization voltage line VL4 through which the first initialization voltage AVINT1 is provided, a second electrode connected with the emission control transistor T6, and a third electrode connected with the j-th second scan line GBLj.

Unlike the inventive concept, in a case where the first light emitting element emits light even when a minimum current of the driving transistor T1, which displays a black image, flows as the driving current, the black image may not be properly displayed. However, according to some embodiments of the inventive concept, the first initialization transistor T7 may make a portion of the minimum current of the driving transistor T1 be branched off as a bypass current to a current path different from a current path in a first light emitting element ED1 side. Here, the minimum current of the driving transistor T1 may mean a current under a condition that a gate-source voltage Vgs of the first driving transistor T1 is smaller than a threshold voltage Vth to turn off the driving transistor T1. In this condition that the driving transistor T1 is turned off, the minimum driving current (e.g., about 10 pA or smaller) may be transferred to the first light emitting element ED1 to display a black luminance image. When the minimum driving current for displaying the black image flows, a bypass transferring effect of the bypass current is large, but when a large driving current for displaying an image, such as a typical image or a white image, flows, the effect of the bypass current is negligible. Accordingly, when the driving current for displaying the black image flows, an accurate block luminance image may be implemented from the driving current using the first initialization transistor T7 and thus a contrast ratio may be improved. Therefore, the display device 1000 with improved display quality may be provided.

The bias transistor T8 may include a first electrode connected to the bias voltage line VL5 through which the bias voltage VOBS is provided, a second electrode connected with the first electrode of the driving transistor T1, and a third electrode connected with the j-th second scan line GBLj.

The first light emitting element ED'1 according to some embodiments of the inventive concept may receive the driving current from the driving transistor T1 and emit prescribed color light to display an image. The driving current may be determined by the threshold voltage Vth, the gate-source voltage Vgs of the driving transistor T1, and a drain-source voltage Vds of the driving transistor T1. The plurality of pixels PX may have different characteristics of the driving transistor T1 and different characteristics of the light emitting element. For example, a change in color coordinates of the display device 1000 may vary (e.g., become reddish) during high frequency driving. However, according to some embodiments of the inventive concept, a voltage of the first electrode of the driving transistor T1 may be controlled through the bias voltage VOBS via the bias transistor T8. According thereto, the driving current is controlled, and thus a luminance deviation (current deviation) for each pixel and a change in color coordinates may be improved. Therefore, the display device 1000 with improved display quality may be provided.

The one terminal of the storage capacitor Cst may be connected to the third electrode of the driving transistor T1, and the other terminal may be connected to the first driving voltage line VL1. A cathode of the light emitting diode ED1 may be connected to the second driving voltage line VL2 through which the second driving voltage ELVSS is transferred. The second driving voltage ELVSS may have a lower level than the first driving voltage ELVDD. According to some embodiments of the inventive concept, the second driving voltage ELVSS may have a lower level than the initialization voltage VINT.

Figure 5:
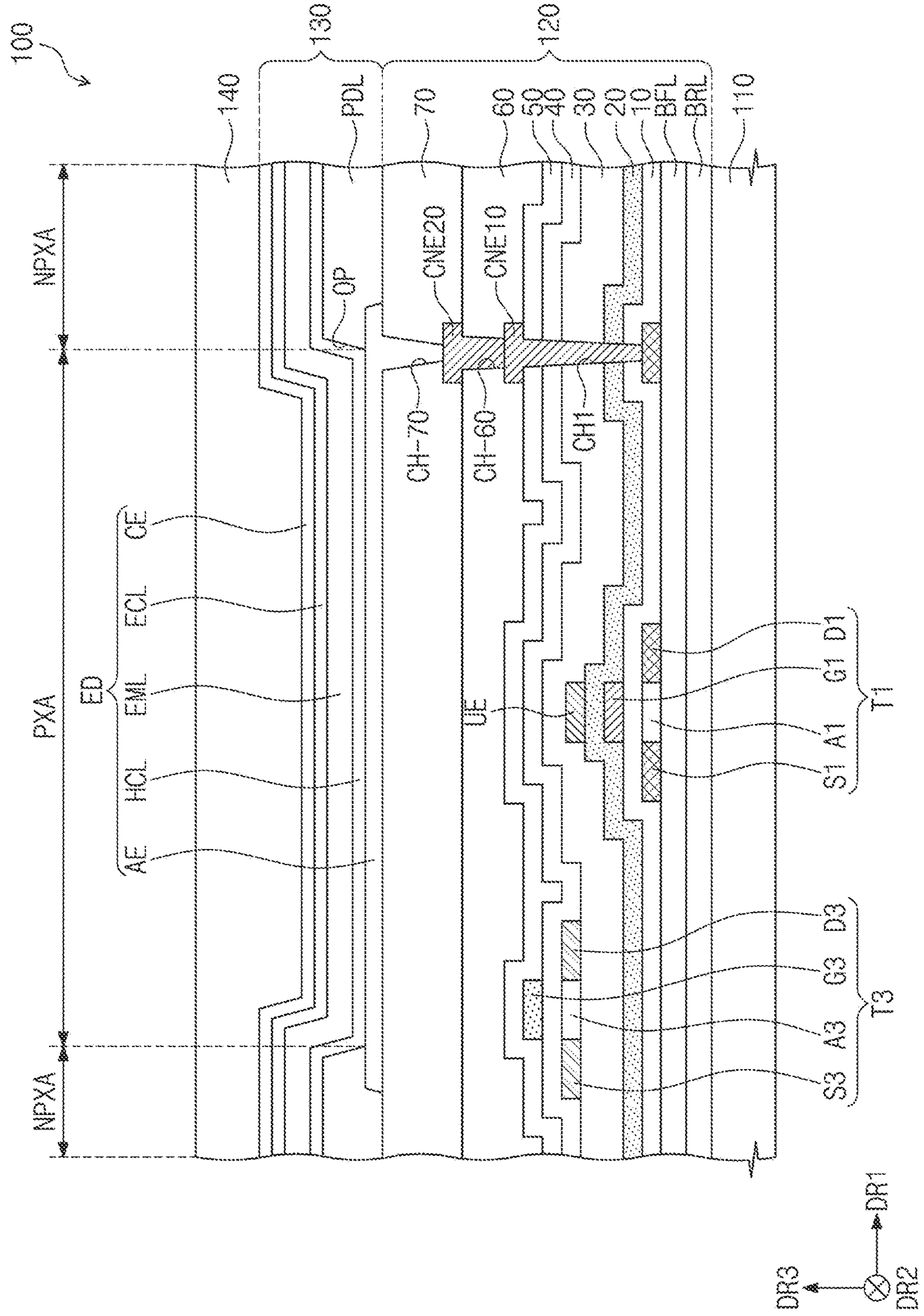
FIG. 5 is a cross-sectional view of a display panel according to some embodiments of the inventive concept.

FIG. 5 is a cross-sectional view of a display panel according to some embodiments of the inventive concept.

Referring to FIG. 5, the display panel 100 may include a substrate 110, a circuit layer 120 located on the substrate 110, an element layer 120, and an encapsulation layer 140.

The substrate 110 may be a member providing a base surface on which the circuit layer 120 is located. The substrate 110 may be a rigid substrate, or a flexible substrate that is bendable, foldable, rollable or the like. The substrate 110 may be a glass substrate, a metal substrate, a polymer substrate or the like. However, the embodiments of the inventive concept are not limited thereto, and the substrate 110 may be an inorganic layer, an organic layer, or a composite material layer.

The substrate 110 may have a multilayer structure. For example, the substrate 110 may include a first synthetic resin layer, an intermediate layer of a multilayer or single-layer structure, and a second synthetic resin layer located on the intermediate layer. The intermediate layer may be referred to as a base barrier layer. The intermediate layer may include a silicon oxide (SiOx) layer and an amorphous silicon (a-Si) layer located on the silicon oxide layer, but is not limited thereto. For example, the intermediate layer may include at least one among a silicon oxide layer, a silicon nitride layer, a silicon oxynitride layer, or an amorphous silicon layer.

Each of the first and second synthetic resin layers may include a polyimide-based resin. In addition, each of the first and second synthetic resin layers may include at least one among an acrylate-based resin, a methacrylate-based resin, a polyisoprene-based resin, a vinyl-based resin, an epoxy-based resin, a urethane-based resin, a cellulose-based resin, a siloxane-based resin, a polyamide-based resin, or a perylene-based resin. Further, according to some embodiments, "--"-based resin means including a functional group of "--".

At least one inorganic layer is provided on the top surface of the substrate 110. The inorganic layer may include at least any one among aluminum oxide, titanium oxide, silicon oxide, silicon oxynitride, zirconium oxide, or hafnium oxide. The inorganic layer may be provided with multiple layers. The inorganic layers of the multiple layers may provide a barrier layer BRL and/or a buffer layer BFL to be described later. The barrier layer BRL and the buffer layer BFL may be selectively arranged.

The barrier layer BRL prevents or reduces instances of a foreign matter entering from the outside. The barrier layer BRL may include a silicon oxide layer and a silicon nitride layer. Each of them may be provided in plural, and the silicon oxide layers and the silicon nitride layers may be alternately laminated.

The buffer layer BFL may be located on the barrier layer BRL. The buffer layer BFL may improve a bonding force between the substrate 110 and a semiconductor pattern and/or a conductive pattern. The buffer layer BFL may include silicon oxide layers and silicon nitride layers. The silicon oxide layers and the silicon nitride layers may be alternately laminated.

The semiconductor pattern may be located on the buffer layer BFL. Hereinafter, the semiconductor pattern directly located on the buffer layer BFL is defined as a first semiconductor pattern. The first semiconductor pattern may include a silicon semiconductor. The first semiconductor pattern may include polysilicon. However, the embodiments of the inventive concept are not limited thereto, and the first semiconductor pattern may also include amorphous silicon.

FIG. 5 only illustrates a portion of the first semiconductor pattern located on the buffer layer BFL, and thus the first semiconductor pattern may be further located in another area of the pixel PXij (see FIG. 4). The first semiconductor pattern may be arranged according to a specific rule across pixels. The first semiconductor pattern may have different electrical properties according to whether it is doped or not. The first semiconductor pattern may include a first area having a high conductivity and a second area having a low conductivity. The first area may be doped with an N-type dopant or a P-type dopant. A P-type transistor includes a doped region doped with a P-type dopant, and an N-type transistor includes a doped area doped with an N-type dopant. The second area may be a non-doped area, or be doped at a lower concentration relative to the first area.

The first area may have a greater conductivity than the second area, and substantially operate as an electrode or a signal line. The second area may substantially correspond to an active area (or channel) of a transistor. In other words, a portion of the semiconductor pattern may be the active area of the transistor, another portion may be a source or a drain of the transistor, and another portion may be a connection electrode or a connection signal line.

As shown in FIG. 5, the first electrode S1, a channel part A1, the second electrode D1 of the driving transistor T1 are provided from the semiconductor pattern. The first electrode S1 and the second electrode D1 of the driving transistor T1 extend in opposite directions from the channel part A1.

FIG. 5 illustrates a portion of the connection signal line CSL provided from the semiconductor pattern. Although not separately illustrated, the connection signal line CSL may be connected to the second electrode of the emission control transistor T6 (see FIG. 4) in a plan view.

A first insulation layer 10 may be located on the buffer layer BFL. The first insulation layer 10 may commonly overlap the plurality of pixels and cover the first semiconductor pattern. The first insulation layer 10 may include an inorganic layer and/or organic layer, and have a single-layer or multilayer structure. The first insulation layer 10 may include at least one among aluminum oxide, titanium oxide, silicon oxide, silicon nitride, silicon oxynitride, zirconium oxide, or hafnium oxide. According to some embodiments, the first insulation layer 10 may be a single silicon oxide layer. Not only the first insulation layer 10, but also the insulation layer of the circuit layer 120 to be described below may be an inorganic layer and/or organic layer, and have a single-layer or multilayer structure. The inorganic layer may include at least one among the aforementioned materials, but is not limited thereto.

The third electrode G1 of the driving transistor T1 may be located on the first insulation layer 10. The third electrode G1 may be a portion of the first conductive pattern. The third electrode G1 of the driving transistor T1 may overlap the channel part A1 of the driving transistor T1. The third electrode G1 of the driving transistor T1 may function as a mask in the process of doping the first semiconductor pattern.

A second insulation layer 20 may be located on the first insulation layer 10, and cover the third electrode G1 of the driving transistor T1. The second insulation layer 20 may include an inorganic layer and/or organic layer, and have a single-layer or multilayer structure. The second insulation layer 20 may include at least one among silicon oxide, silicon nitride, or silicon oxynitride. According to some embodiments, the second insulation layer 20 may have a multilayer structure including a silicon oxide layer and a silicon nitride layer.

A third insulation layer 30 may be located on the second insulation layer 20. The third insulation layer 30 may have a single-layer or multilayer structure. For example, the third insulation layer 30 may have a multilayer structure including a silicon oxide layer and a silicon nitride layer. A top electrode UE of the storage capacitor Cst may be located between the second insulation layer 20 and the third insulation layer 30. In addition, a bottom electrode of the storage capacitor Cst may be located between the first insulation layer 10 and the second insulation layer 20.

According to some embodiments of the inventive concept, the second insulation layer 20 may be replaced with an insulation pattern. The top electrode UE may be located on the insulation pattern. The top electrode UE may serve as a mask for providing an insulation pattern from the second insulation layer 20.

The second semiconductor pattern may be located on the third insulation layer 30. The second semiconductor pattern may include an oxide semiconductor. The oxide semiconductor may include a plurality of areas divided according to whether a metal oxide is reduced. An area (hereinafter, a reduction area) in which the metal oxide has been reduced has a higher conductivity in comparison to an area (hereinafter, a non-reduction area) in which the metal oxide has not been reduced. The reduction area may substantially serve as a source/drain or a signal line of the transistor. The non-reduction area substantially corresponds to an active area (or the semiconductor area, the channel part) of the transistor. In other words, a portion of the second semiconductor pattern may be the active area of the transistor, another portion may be a source/drain area of the transistor, and another portion may be a signal transfer area.

As shown in FIG. 5, the first electrode S3, the channel part A3, and the second electrode D3 of the compensation transistor T3 may be provided from the second semiconductor pattern. The first electrode S3 and the second electrode D3 may include a metal reduced from a metal-oxide-semiconductor. Each of the first electrode S3 and the second electrode D3 may have a metal layer with a prescribed thickness from the top surface of the second semiconductor pattern, and including the reduced metal.

A fourth insulation layer 40 may be located on the third insulation layer 30. The fourth insulation layer 40 may commonly overlap the plurality of pixels and cover the second semiconductor pattern. The fourth insulation layer 40 may include at least one among aluminum oxide, titanium oxide, silicon oxide, silicon nitride, silicon oxynitride, zirconium oxide, or hafnium oxide.

The third electrode G3 of the compensation transistor T3 may be located on the fourth insulation layer 40. The third electrode G3 may be a portion of the third conductive pattern. The third electrode G3 of the compensation transistor T3 may overlap the channel part A3 of the compensation transistor T3. The third electrode G3 of the compensation transistor T3 may function as a mask in the process of doping the second semiconductor pattern.

According to some embodiments of the inventive concept, the fourth insulation layer 40 may be replaced with an insulation pattern. The third electrode G3 of the compensation transistor T3 may be located on the insulation pattern. According to some embodiments, the third electrode G3 may have the same shape as the insulation pattern in a plan view. According to some embodiments, a single third electrode G3 is shown for convenience of description, but the compensation transistor T3 may include two third electrodes.

A fifth insulation layer 50 may be located on the fourth insulation layer 40, and cover the third electrode G3 of the compensation transistor T3. The fifth insulation layer 50 may include an inorganic layer and/or organic layer, and have a single-layer or multilayer structure. For example, the fifth insulation layer 50 may include a silicon oxide layer and a silicon nitride layer. The fifth insulation layer 50 may include a plurality of silicon oxide layers and silicon nitride layers alternately laminated.

According to some embodiments, the first and second electrodes of the initialization transistor T4 (see FIG. 4) may be provided through the same process as the first electrode S3 and the second electrode D3 of the compensation transistor T3.

The first connection electrode CNE10 may be located on the fifth insulation layer 50. The first connection electrode CNE10 may be connected to the connection signal line CSL through a contact hole CH1 penetrating through the first to fifth insulation layers 10, 20, 30, 40 and 50.

A sixth insulation layer 60 may be located on the fifth insulation layer 50. A second connection electrode CNE20 may be located on the sixth insulation layer 60. The connection electrode CNE20 may be connected to the first connection electrode CNE10 through a contact hole CH-60 penetrating through the sixth insulation layer 60. A seventh insulation layer 70 may be located on the sixth insulation layer 60 and cover the second connection electrode CNE20.

Each of the sixth and seventh insulation layers 60 and 70 may be an organic layer. For example, each of the sixth and seventh insulation layers 60 and 70 may include a general purpose polymer such as Benzocyclobutene (BCD), polyimide, Hexamethyldisiloxane (HMDSO), Polymethylmethacrylate (PMMA) or Polystyrene (PS), a polymer derivative having a phenol group, an acrylic-based polymer, an imide-based polymer, an aryl ether-based polymer, an amide-based polymer, a fluorine-based polymer, a p-xylene-based polymer, a vinylalcohol-based polymer, or a blend thereof.

An element layer 130 may include the light emitting element ED and a pixel definition layer PDL. The light emitting element ED may include an anode AE, a hole control layer HCL, a light emitting layer EML, an electron control layer ECL, and a cathode CE.

The anode AE may be located on the seventh insulation layer 70. The anode AE may be connected with the second connection electrode CNE20 through a contact hole CH-70 penetrating through the seventh insulation layer 70. The anode AE may be a (semi-) transmissive electrode or a reflective electrode. According to some embodiments, the anode AE may include a reflective layer composed of Ag, Mg, Al, Pt, Pd, Au, Ni, Nd, Ir, Cr or a compound thereof, and a transparent or semi-transparent electrode layer located on the reflective layer. The transparent or semi-transparent electrode layer may include at least one selected from the group consisting of indium tin oxide (ITO), indium zinc oxide (IZO), indium gallium zinc oxide (IGZO) or indium oxide ($In_2O_3$), and aluminum-doped aluminum zinc oxide (AZO). For example, the anode AE may be provided with ITO/Ag/ITO.

The pixel definition layer PDL may be located on the seventh insulation layer 70. According to some embodiments, the pixel definition layer PDL may have light absorption property, and, for example, the pixel definition layer PDL may have a black color. The pixel definition layer PDL may include a black coloring agent. The black coloring agent may include a black dye or a black pigment. The black coloring agent may include carbon black, aniline black, a metal such as chromium, or an oxide thereof. The pixel definition layer PDL may be provided with a mixture of a blue organic material and a black organic material. The pixel definition layer PDL may include a lyophobic organic material.

An opening OP of the pixel definition layer PDL exposes at least a portion of the anode AE of the light emitting element ED. The opening OP of the pixel definition layer PDL may define a light emitting area PXA. For example, the plurality of pixels (see FIG. 3) may be located on a plane of the display panel 100 in a certain rule. An area in which the plurality of pixels PX (see FIG. 3) may be defined as the pixel area, and one pixel area may include the light emitting area PXA and a non-light emitting area NPXA adjacent to the light emitting area PXA. The non-light emitting area NPXA may surround the light emitting area PXA.

The hole control layer HCL may be commonly arranged in the light emitting area PXA and the non-light emitting area NPXA. A common layer such as the hole control layer HCL may be commonly provided in the plurality of pixels (see FIG. 3). The hole control layer HCL may include a hole transport layer and a hole injection layer.

A light emitting layer EML is located on the hole control layer HCL. The light emitting layer EML may be commonly located in the plurality of pixels PX (see FIG. 3). In other words, the light emitting layer EML may be commonly arranged in the light emitting area PXA and the non-light emitting area NPXA. For example, the light emitting layer EML may be commonly provided by an open mask in both of the light emitting area PXA and the non-light emitting area NPXA. In this case, the light emitting layer EML may generate source light such as white light or blue light. In addition, the light emission layer EML may have a multilayer structure.

The display device 1000 (see FIG. 1) may further include light control layer configured to control the color of the source light. For example, the light control layer may be provided between the sensor layer 200 (see FIG. 2) and the optical film 300 (see FIG. 2). The light control layer may convert the optical property of the source light generated from the light emitting layer EML. The light control layer may include a light conversion pattern for converting the source light into light of a different color and a scattering pattern for scattering the source light. Alternatively, only colors corresponding to respective color filters may be passed through the optical film 300 (see FIG. 2) including the color filters without addition of the light control layer.

According to some embodiments of the inventive concept, the light emitting layer EML may be located only in an area corresponding to the opening OP. In this case, the light emitting layer EML may be provided in plural, and the plurality of light emitting layers EML may be respectively separated and provided to the plurality of pixels PX (see FIG. 3). The light emitting layers EML may generate the source light of white light or blue light. Alternatively, a portion of the light emitting layers EML may generate red light, another portion may generate green light, and another portion may generate blue light. However, this is just an example, and a portion of the light emitting layers EML may generate mixed-color light, for example, magenta light, yellow light or cyan light.

An electron control layer ECL is located on the light emitting layer EML. The electron control layer ECL may include an electron transport layer and an electron injection layer. The cathode CE of the light emitting element ED is located on the electron control layer ECL. The electron control layer ECL and the cathode CE are commonly located in the plurality of pixels (see FIG. 3).

The encapsulation layer 140 is located on the cathode CE. The encapsulation layer 140 may cover the plurality of pixels PX (see FIG. 3). According to some embodiments, the encapsulation layer 140 may directly cover the cathode CE. According to some embodiments of the inventive concept, the display panel 100 may further include a capping layer for directly covering the cathode CE. According to some embodiments of the inventive concept, a laminate structure of the light emitting element ED may have a vertically inverted structure of the structure shown in FIG. 5.

The encapsulation layer 140 may be located on the element layer 130. The encapsulation layer 140 includes at least an inorganic layer or an organic layer. According to some embodiments of the inventive concept, the encapsulation layer 140 may include two inorganic layers and an organic layer interposed therebetween. According to some embodiments of the inventive concept, a thin-film encapsulation layer may include a plurality of inorganic layers and a plurality of organic layers that are alternately laminated.

The encapsulation organic layer protects the light emitting element ED from moisture/oxygen, and from a foreign matter such as a dust particle. The encapsulation inorganic layer may include a silicon nitride layer, a silicon oxynitride layer, a silicon oxide layer, a titanium oxide layer, aluminum oxide layer or the like, and is not particularly limited thereto. The encapsulation organic layer may include an acrylic-based inorganic layer, but is not particularly limited thereto.

Figure 6:
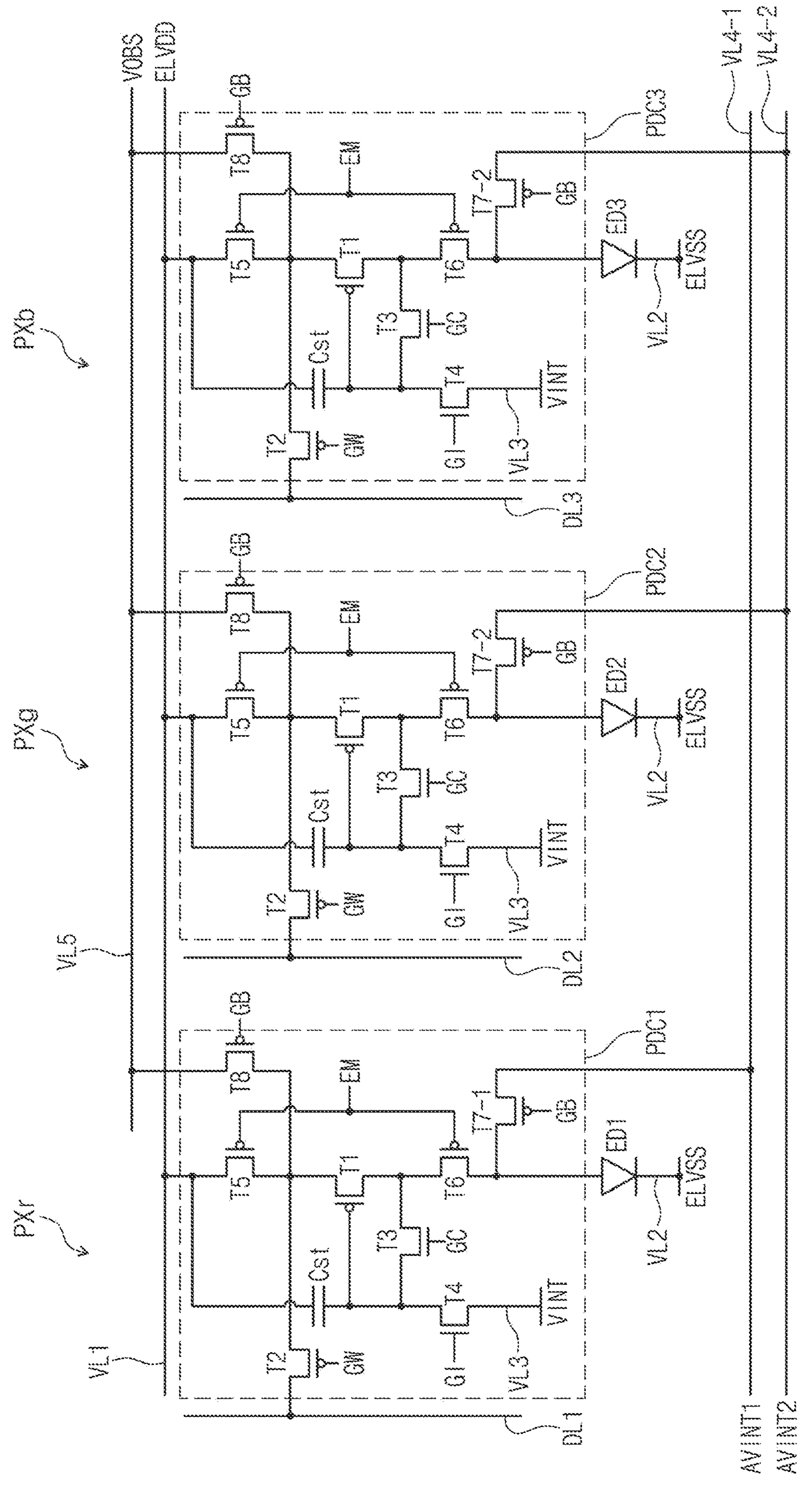
FIG. 6 is a circuit diagram showing some pixels according to some embodiments of the inventive concept.

FIG. 6 is a circuit diagram illustrating some pixels according to some embodiments of the inventive concept. In description of FIG. 6, like reference numerals are used for like elements described with reference to FIG. 4, and descriptions thereabout will be omitted.

Referring to FIG. 6, the plurality of pixels PX (see FIG. 3) may include a first subpixel PXr, a second subpixel PXg, and a third subpixel PXb.

The first subpixel PXr, the second subpixel PXg, and the third subpixel PXb may share one of the plurality of scan lines CL1 to CLn (see FIG. 3). The first subpixel PXr may be electrically connected to the first data line DL1 that is one of the plurality of data lines DL1 to DLm. The second subpixel PXg may be electrically connected to the second data line DL2 that is another one of the plurality of data lines DL1 to DLm. The third subpixel PXb may be electrically connected to the first data line DL3 that is another one of the plurality of data lines DL1 to DLm.

The first subpixel PXr may include the first pixel circuit PDC1 and the first light emitting element ED1. A first initialization transistor T7-1 of the first pixel circuit PDC1 may be connected between a first initialization voltage line VL4-1 and the anode of the first light emitting element ED1 and receive a second scan signal GB. The first light emitting element ED1 may emit first light. The first light may be red light.

The second subpixel PXg may include a second pixel circuit PDC2 and a second light emitting element ED2. A second initialization transistor T7-2 of the second pixel circuit PDC2 may be connected between a second initialization voltage line VL4-2 and an anode of the second light emitting element ED2 and receive the second scan signal GB. The second light emitting element ED2 may emit second light different from the first light. The second light may be green light.

The third subpixel PXb may include a third pixel circuit PDC3 and a third light emitting element ED3. The second initialization transistor T7-2 of the third pixel circuit PDC3 may be connected between the second initialization voltage line VL4-2 and an anode of the third light emitting element ED3 and receive the second scan signal GB. The third light emitting element ED3 may emit third light different from the first light and the second light. The third light may be blue light.

The first initialization voltage AVINT1 may be provided to the first initialization voltage line VL4-1. The second initialization voltage AVINT2 may be provided to the second initialization voltage line VL4-2. The first initialization voltage AVINT1 may have a lower level than the second initialization voltage AVINT2. For example, the first initialization voltage AVINT1 may be about 0.3 V, and the second initialization voltage AVINT2 may be about 1.5 V.

Unlike the inventive concept, when a sufficient positive current is not delivered to a light emitting element, a response speed of a first frame may be reduced. In this case, an image degradation phenomenon such as a color shift may occur. The response speed of a first frame may be further reduced in a low grayscale image than in a high grayscale image. In addition, the response speed of a first frame may be different according to a color component that is displayed by a light emitting element. For example, a response speed of a light emitting element configured to emit green light may be lower than that configured to emit red light. However, according to some embodiments of the inventive concept, the first pixel circuit PDC1 of the first subpixel PXr may be connected with the first initialization voltage line VL4-1 through which the first initialization voltage AVINT1 is provided. The first pixel circuit PDC1 may be electrically connected with the first light emitting element ED1 configured to emit red light. The second pixel circuit PDC2 of the second subpixel PXg may be connected with the second initialization voltage line VL4-2 through which the second initialization voltage AVINT2 having a higher voltage level than the first initialization voltage AVINT1 is provided. The second pixel circuit PDC2 may be electrically connected with the second light emitting element ED2 configured to emit green light. The third pixel circuit PDC3 of the third subpixel PXb may be connected with the second initialization voltage ling VL4-2 through which the second initialization voltage AVINT2 is provided. The third pixel circuit PDC3 may be electrically connected with the third light emitting element ED3 configured to emit blue light. In other words, the initialization voltages AVINT1 and AVINT2 may be provided differently according to the type of the pixel. As the response speed of a first frame is improved, the initialization voltages AVINT1 and AVINT2 may be adjusted. When displaying an image, the display device 1000 may be adjusted so that the color coordinates is not concentrated on a specific color. Accordingly, the display device 1000 with improved display performance may be provided.

FIG. 6 illustrates an example in which the first pixel circuit PDC1 is connected to the first initialization voltage line VL4-1, the second pixel circuit PDC2 and the third pixel circuit PDC3 are connected to the second initialization voltage line VL4-2, but initialization voltages respectively provided to the first pixel circuit PDC1, the second pixel circuit PDC2, and the third pixel circuit PDC3 according to some embodiments of the inventive concept are not limited thereto. For example, the first pixel circuit PDC1, the second pixel circuit PDC2, and the third pixel circuit PDC3 may be respectively connected with different initialization voltage lines, and be provided with different initialization voltages.

Figure 7:
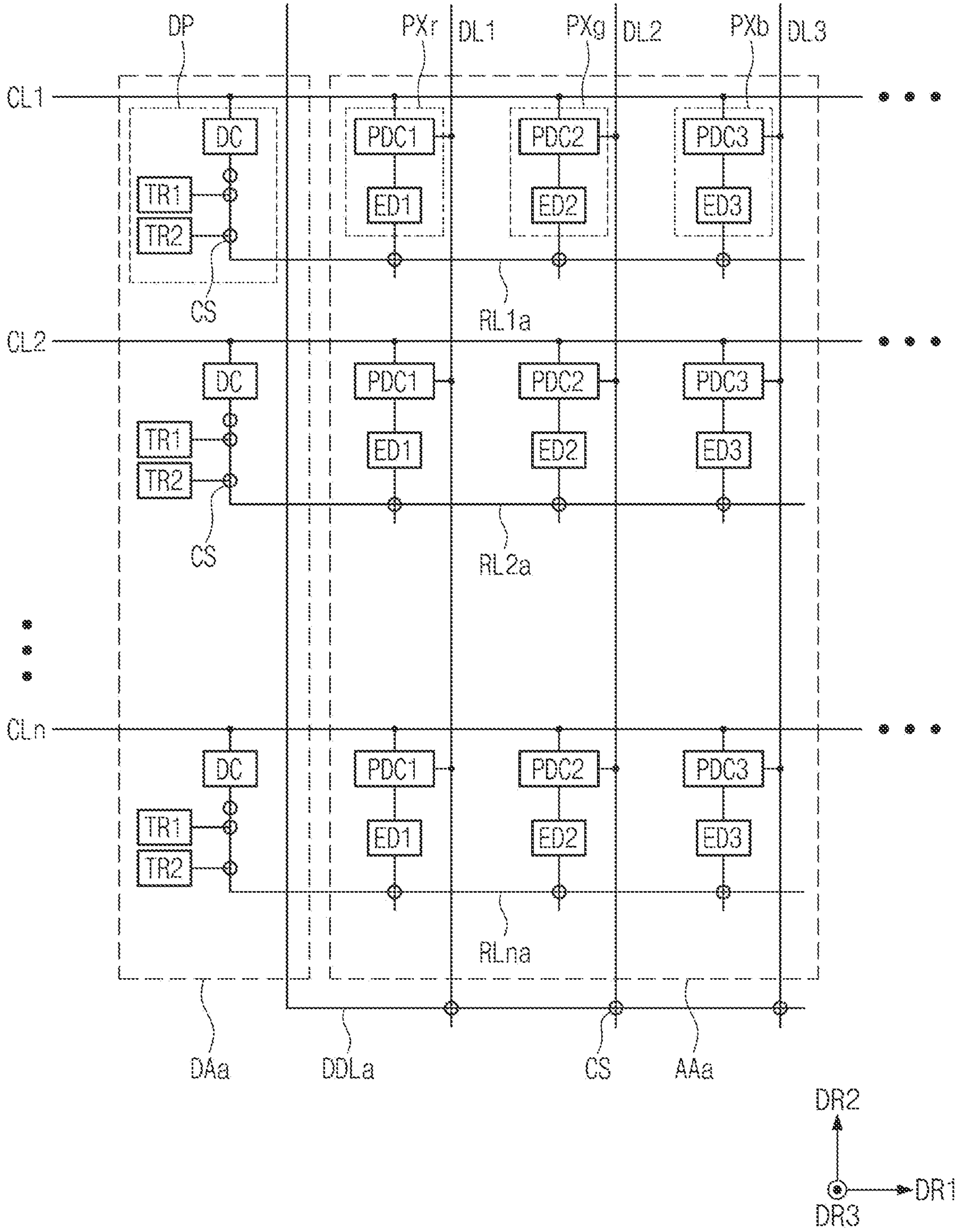
FIG. 7 shows a portion of a display device according to some embodiments of the inventive concept.

FIG. 7 shows a portion of a display device according to some embodiments of the inventive concept. In description about FIG. 7, like reference numerals are used for like elements described with reference to FIGS. 3 and 6, and descriptions thereabout will be omitted.

FIG. 7 illustrates an example first sub-display area AAa and an example first sub-dummy area DAa, but these types may be identically applied to the second sub-display area AAb (see FIG. 3) and the second sub-dummy area Dab (see FIG. 3).

Referring to FIG. 7, the display device 1000 (see FIG. 1) may include a plurality of pixels PX (see FIG. 3), a plurality of dummy pixels DP, and a plurality of repair lines RL1*a* and Rl2*a* to RLna.

The plurality of pixels PX (see FIG. 3) may include the first subpixel PXr, the second subpixel PXg, and the third subpixel PXb. The first subpixel PXr may be electrically connected with the first data line DL1. The second subpixel PXg may be electrically connected with the second data line DL2. The third subpixel PXb may be electrically connected with the third data line DL3. The first data line DL1, the second data line DL2, and the third data line DL3 may be arranged to be connectable with the first dummy data line DDLa through the connectable structure CS.

The first subpixel PXr, the second subpixel PXg, and the third subpixel PXb may be located in the first sub-display area AAa.

The plurality of dummy pixels DP may be located in the sub-dummy area DAa adjacent to the first sun-dummy area AAa in the first direction DR1. The plurality of dummy pixels DP may be respectively electrically connected with the plurality of scan lines CL1 and CL2 to CLn.

Each of the plurality of dummy pixels DP may include a first transistor TR1, a second transistor TR2, and a dummy pixel circuit DC.

The first transistor TR1 may be arranged to be connectable with each of the plurality of repair lines RL1*a* and RL2 to RLna through the connectable structure CS. The first transistor TR1 may be electrically connected with the first initialization voltage line VL4-1 (see FIG. 6).

The second transistor TR2 may be arranged to be connectable with each of the plurality of repair lines RL1*a* and RL2 to RLna through a connectable structure CS. The second transistor TR2 may be electrically connected with the second initialization voltage line VL4-2 (see FIG. 6).

The dummy pixel circuit DC may be arranged to be connectable with each of the plurality of repair lines RL1*a* and RL2 to RLna through a connectable structure CS. The dummy pixel circuit DC may be electrically connected with each of the plurality of scan lines CL1 and CL2 to CLn.

The plurality of dummy pixels DP may be arranged in a line in the second direction DR2.

According to some embodiments of the inventive concept, each of the plurality of dummy pixels DP may include the first transistor TR1 electrically connected with the first initialization voltage line VL4-1 and the second transistor TR2 electrically connected with the second initialization voltage line VL4-2 (see FIG. 6). In other words, one dummy pixel DP may be connected with the first initialization voltage line VL4-1 (see FIG. 6) or the second initialization voltage line VL4-2 (see FIG. 6) according to the repair process. Accordingly, one dummy pixel DP may be located in one pixel row composed of the plurality of pixels PX (see FIG. 3). Therefore, the area of the first sub-dummy area DAa may be reduced. Accordingly, the display device 1000 (see FIG. 1) with a reduced area of the non-display area NDA (see FIG. 3) may be provided.

One dummy pixel DP, the first subpixel PXr, the second subpixel PXg, and the third subpixel PXb may be arranged in the first direction DR1. One dummy pixel DP, the first subpixel PXr, the second subpixel PXg, and the third subpixel PXb located in the same row may be electrically connected with the corresponding scan line CL1 extending in the first direction DR1.

The plurality of repair lines RL1*a* and RL2*a* to RLna may be respectively arranged to be connectable with the plurality of dummy pixels DP and the plurality of pixels PX (see FIG. 3).

Figure 8:
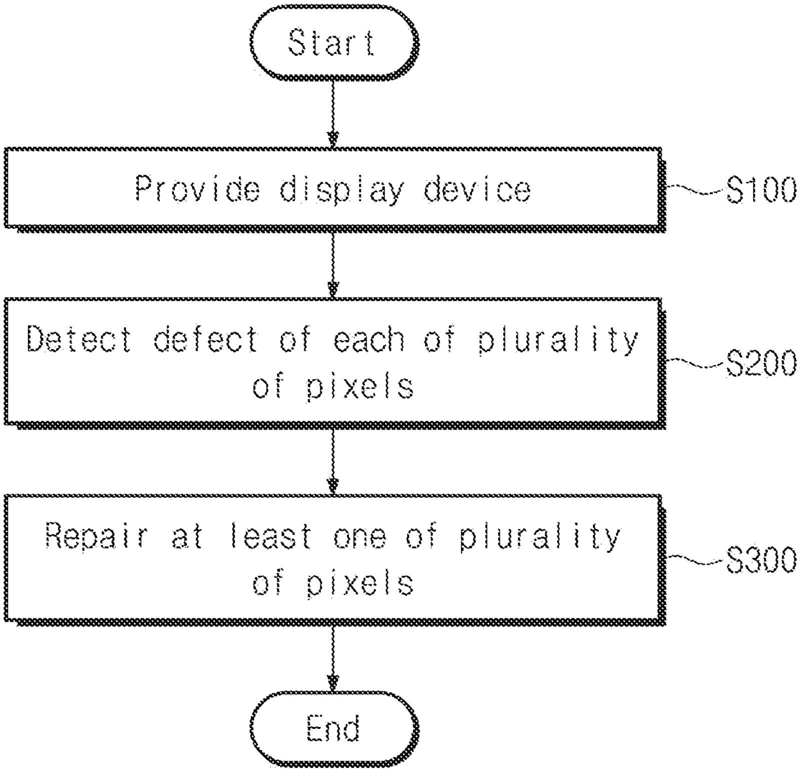
FIG. 8 is a flowchart of a display device repair method according to some embodiments of the inventive concept.
Figure 9:
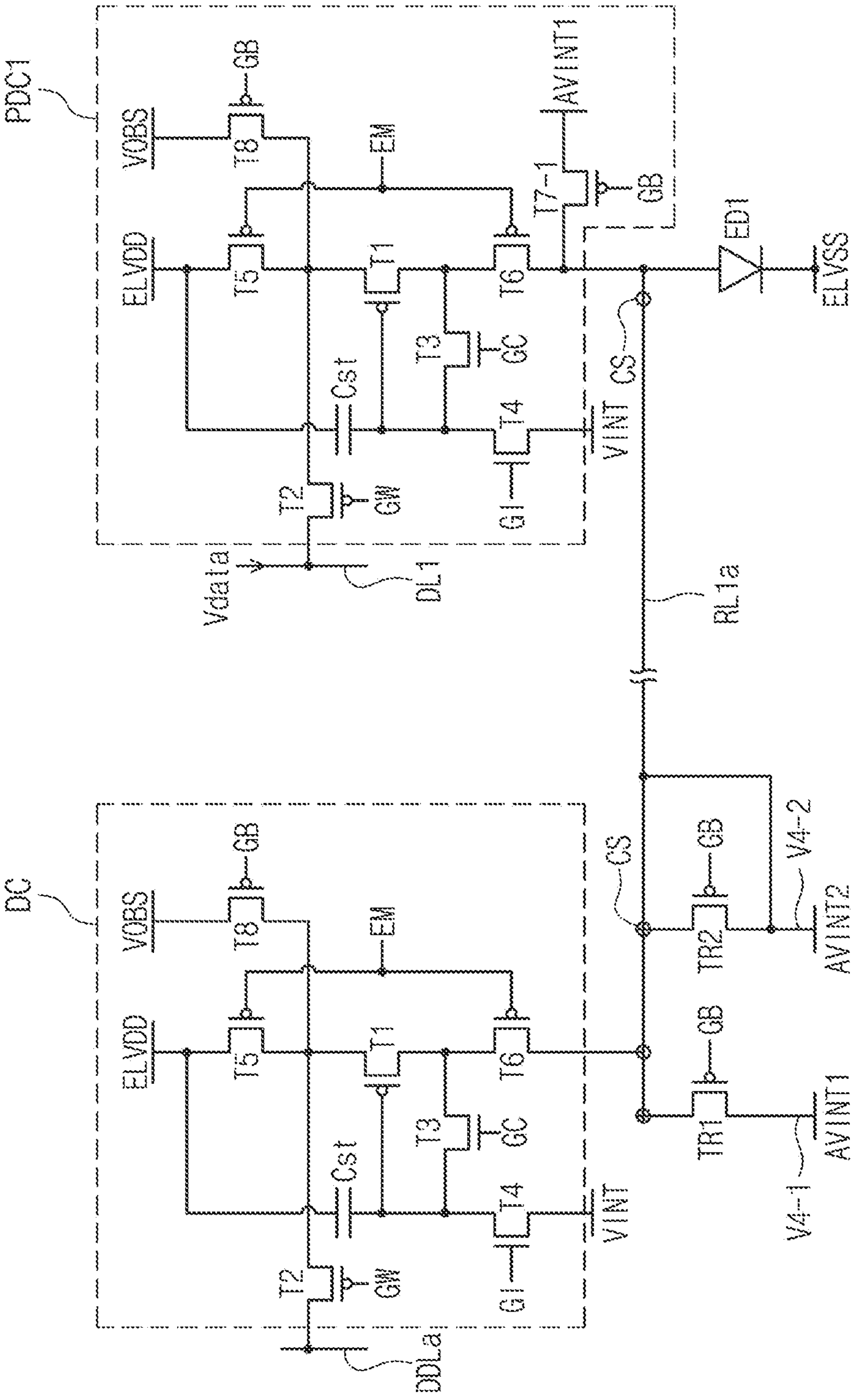
FIGS. 9 to 11 are pixel circuit diagrams showing one pixel and one dummy pixel according to some embodiments of the inventive concept.
Figure 10:
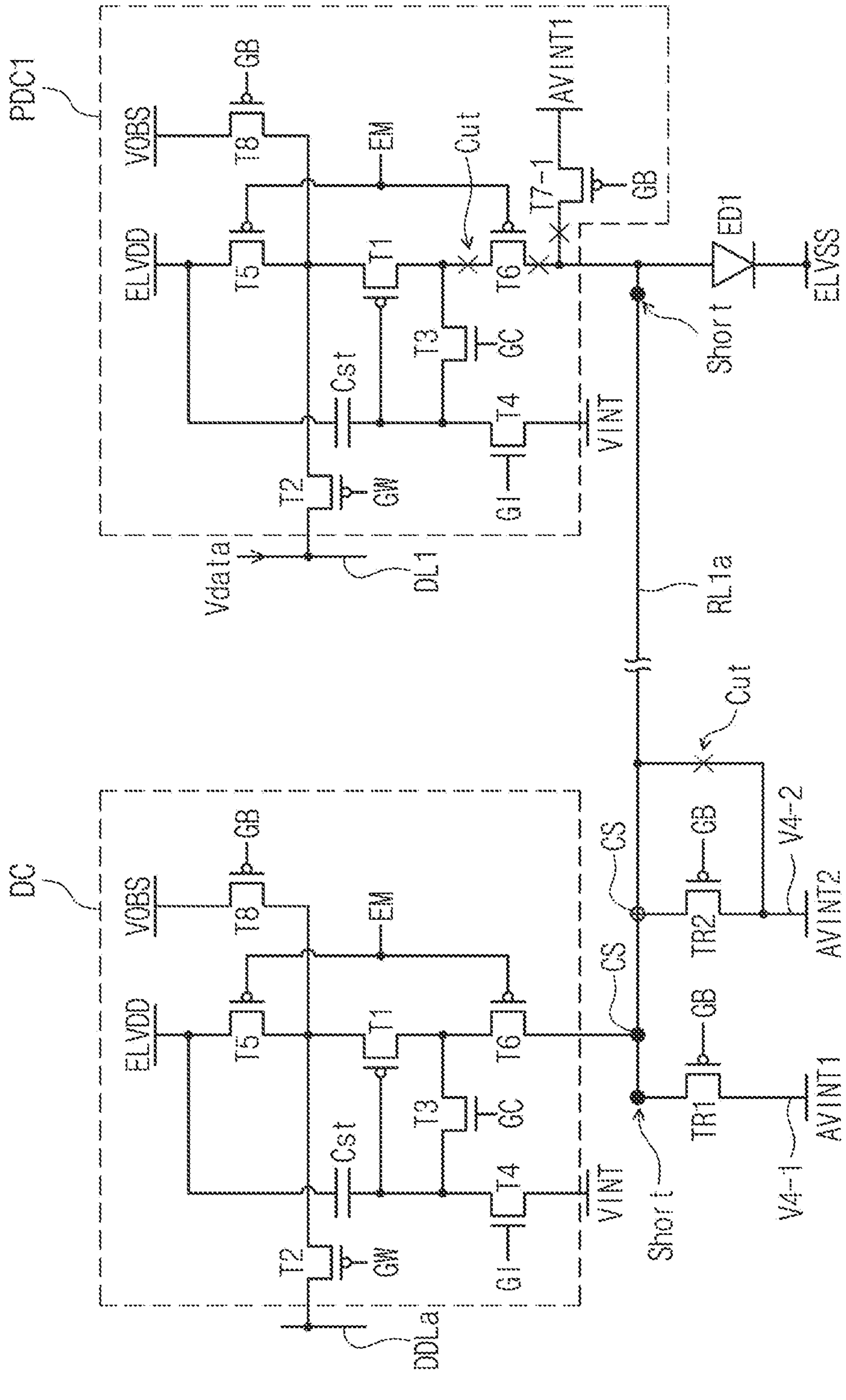
Figure 11:
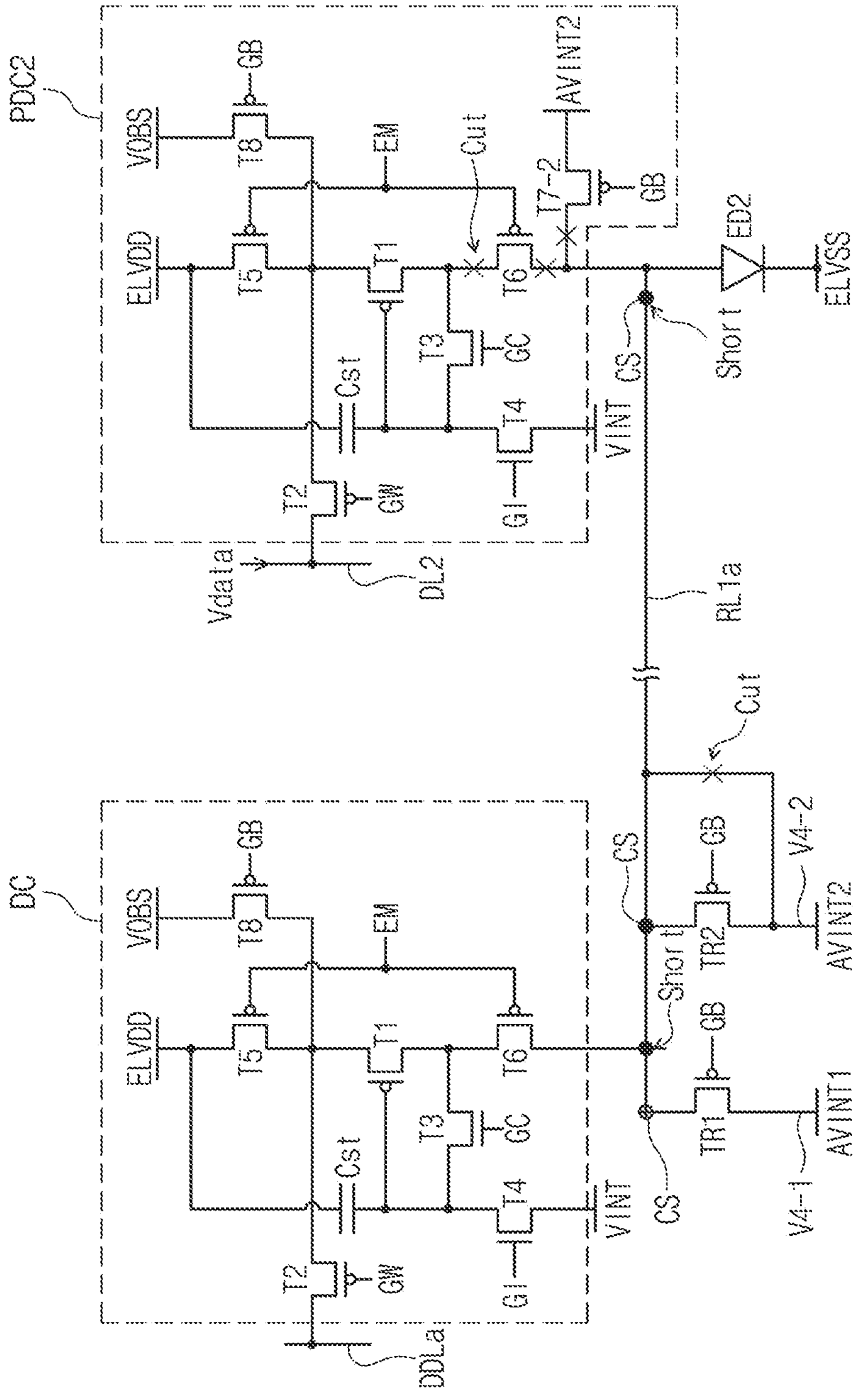

FIG. 8 is a flowchart showing a display device repair method according to some embodiments of the inventive concept, and FIGS. 9 to 11 are circuit diagrams showing one pixel and one dummy pixel according to some embodiments of the inventive concept. In description about FIGS. 9 to 11, like reference numerals are used for like elements described with reference to FIGS. 4 and 6, and descriptions thereabout will be omitted.

Referring to FIGS. 8 to 11, in order to repair the display device 1000 (see FIG. 1), the display device 1000 (see FIG. 1) including the dummy pixel DP and the repair line RL1*a*, may be provided (step S100).

The plurality of pixels PX (see FIG. 3) may detect defects of the plurality of respective pixels PX (see FIG. 3) through the repair method (step S200). The defects may refer to a bright spot in an emission state all the time, or a dark spot in a non-emission state all the time regardless of the scan signals GI, GW, GC, GB, and EM and the data signal Vdata provided to the plurality of pixels PX (see FIG. 3).

FIG. 9 illustrates a first pixel circuit PDC1 in which a defect does not occur and the dummy pixel DP (see FIG. 7).

The first pixel circuit PDC1 and the anode of the first light emitting element ED1 may be arranged to be connectable with the repair line RL1*a* through connectable structures CS.

The dummy pixel DP (see FIG. 7) may include the dummy pixel circuit DC, the first transistor TR1, and the second transistor TR2.

The dummy pixel circuit DC may include a driving transistor T1, a switching transistor T2, a compensation transistor T3, an initialization transistor T4, an operation control transistor T5, an emission control transistor T6, and a bias transistor T8. In other words, the dummy pixel circuit DC may be substantially same as the configuration of the first pixel circuit PDC1 except for the first initialization transistor T7-1.

The dummy pixel circuit DC may be arranged to be connectable with the repair line RL1*a* through the connectable structure CS.

The first transistor TR1 and the second transistor TR2 may be located adjacent to the dummy pixel circuit DC.

The repair line RL1*a* may be adjacent to each of the dummy pixel circuit DC, the first transistor TR1, the second transistor TR2, and the plurality of pixels PX (see FIG. 3), and be open-circuited.

The repair line RL1*a* may be electrically connected with the second initialization voltage line V4-2 through which the second initialization voltage AVINT2 is provided. In the repair process, the repair line RL1*a* may be connected separably with the second initialization voltage line V4-2. However, this is an example, and the connection relationship with the repair line RL1*a* according to some embodiments of the inventive concept is not limited thereto. For example, the repair line RL1*a* may be electrically connected with the first initialization voltage line V4-1 through which the first initialization voltage AVINT1 is provided.

Unlike the inventive concept, when the repair line RL1*a* is not connected with a line through which a prescribed voltage is provided, the repair line RL1*a* may be floated. The floated line may influence the adjacent scan lines CL1 to CLn (see FIG. 3) and the adjacent data lines DL1 to DLm. However, according to some embodiments of the inventive concept, the second initialization voltage AVINT2 may be provided to the repair line RL1*a*. Accordingly, the display apparatus 1000 (see FIG. 1) with improved reliability may be provided.

After the defect is detected, the defective pixels among the plurality of pixels (see FIG. 3) may be repaired (steps S300).

FIG. 10 illustrates a case where a defect occurs in the first pixel PXr (see FIG. 6).

When the first pixel circuit PDC1 connected to the first scan line CL1 (see FIG. 7) and the first data line DL1 is defective, the anode of the first light emitting element ED1 may be electrically insulated from the first pixel circuit PDC1 and the second transistor TR2. The first electrode of the emission control transistor T6, the second electrode of the emission control transistor T6, and the second electrode of the first initialization transistor T7-1 may be separated from the anode of the first light emitting element ED1. For example, when the first electrode of the emission control transistor T6, the second electrode of the emission control transistor T6, and the second electrode of the first initialization transistor T7-1 are emitted with laser light and cut off, the defective first pixel circuit PDC1 may be electrically open-circuited from the first light emitting element ED1.

According to some embodiments of the inventive concept, in the repair process, the first electrode of the emission control transistor T6 may also be emitted with the laser light and cut off. Accordingly, even when the second electrode of the emission control transistor T6 is not properly insulated, the first light emitting element ED1 may be insulated from the first pixel circuit PDC1. Accordingly, the display device 1000 (see FIG. 1) with improved reliability may be provided.

A line through which the repair line RL1*a* is connected with the second initialization voltage line V4-2 is emitted with the laser light and cut off. The cut-off line is indicated as "X" in the drawing.

The anode of the first light emitting element ED1 may be electrically connected with the dummy pixel circuit DC and the first transistor TR1 through connectable structures CS. The repair line RL1*a*, the dummy pixel circuit DC, and the first transistor TR1 may be connected with the anode of the first light emitting element ED1. For example, when the laser light is emitted to the connectable structures CS located between the anode of the first light emitting element ED1, the dummy pixel circuit DC, and the first transistor TR1, insulation films between first and second conductors of the connectable structures CS may be broken down to make the first and second conductors short-circuited electrically.

The dummy pixel circuit DC and the first transistor TR1 may have the same circuit as the first pixel circuit PDC1 to which the first initialization voltage AVINT1 is provided.

Here, the first dummy data line DDLa and the first data line DL1 may be electrically connected through a connectable structure CS (see FIG. 7). For example, when the laser light is emitted to the connectable structure CS (see FIG. 7) between the first dummy data line DDLa and the first data line DL1, the first dummy data line DDLa may be electrically short-circuited with the first data line DL1.

In the specification, when the first and second conductors of the connectable structure CS are electrically insulated from each other, the connectable structure CS is shown as a white circle, and when the first and second conductors of the connectable structure CS are electrically connected with each other, the connectable structure CS may be shown as a black circle.

According to some embodiments of the inventive concept, the dummy pixel circuit DC, the first transistor TR1, and the first pixel circuit PDC1 may be connected with the same first scan line CL1 (see FIG. 7). In other words, the dummy pixel circuit DC, the first transistor TR1, and the first pixel circuit PDC1 may be provided with the same scan signals GI, GW, GC, GB, and EM. Because the first data line DL1 connected to the first pixel circuit PDC1 is connected to the first dummy data line DDLa, the data signal Vdata applied to the first pixel circuit PDC1 may also be identically provided to the dummy pixel circuit DC. The dummy pixel circuit DC may generate a driving current corresponding to the data signal Vdata, and provide the driving current to the first light emitting element ED1 through the repair line RL1*a*. The first light emitting element ED1 may emit light by the driving current. Accordingly, the defect of the first pixel circuit PDC1 may be repaired by the dummy pixel circuit DC and the first transistor TR1. Accordingly, the display apparatus 1000 (see FIG. 1) with improved reliability may be provided.

FIG. 11 illustrates a case where a defect occurs in the first pixel PXr (see FIG. 6). Alternatively, the repairing may also be identically applied to a case where the defect occurs in the third pixel PXb (see FIG. 6).

When the second pixel circuit PDC2 connected to the first scan line CL1 (see FIG. 7) and the second data line DL2 is defective, the anode of the second light emitting element ED2 may be electrically insulated from the second transistor PDC2 and the first transistor TR1. The first electrode of the emission control transistor T6, the second electrode of the emission control transistor T6, and the second electrode of the second initialization transistor T7-2 may be separated from the anode of the second light emitting element ED2. For example, when the first electrode of the emission control transistor T6, the second electrode of the emission control transistor T6, and the second electrode of the second initialization transistor T7-2 are emitted with laser light and cut off, the defective second pixel circuit PDC2 may be electrically open-circuited from the second light emitting element ED2.

The laser light is emitted to and cuts off a line through which the repair line RL1*a* is connected with the second initialization voltage line V4-2.

The anode of the second light emitting element ED2 may be electrically connected with the dummy pixel circuit DC and the second transistor TR2 through connectable structures CS. The repair line RL1*a*, the dummy pixel circuit DC, and the second transistor TR2 may be connected with the anode of the second light emitting element ED2. For example, when the laser light is emitted to the connectable structures CS located between the anode of the second light emitting element ED2, the dummy pixel circuit DC, and the second transistor TR2, insulation films between the first and second conductors of the connectable structures CS are broken down to electrically short-circuit the first and second conductors.

The dummy pixel circuit DC and the second transistor TR2 may have the same circuit as the second pixel circuit PDC2 provided with the second initialization voltage AVINT2.

Here, the first dummy data line DDLa and the second data line DL2 may be electrically connected through a connectable structure CS (see FIG. 7). For example, when the laser light is emitted to the connectable structure CS (see FIG. 7) between the first dummy data line DDLa and the second data line DL2, the first dummy data line DDLa may be electrically short-circuited with the second data line DL2.

According to some embodiments of the inventive concept, the dummy pixel circuit DC, the second transistor TR2, and the second pixel circuit PDC2 may be connected with the same first scan line CL1 (see FIG. 7). In other words, the dummy pixel circuit DC, the second transistor TR2, and the second pixel circuit PDC2 may be provided with the same scan signals GI, GW, GC, GB, and EM. Because the second data line DL2 connected to the second pixel circuit PDC2 is connected to the first dummy data line DDLa, the data signal Vdata applied to the second pixel circuit PDC2 may also be identically provided to the dummy pixel circuit DC. The dummy pixel circuit DC may generate a driving current corresponding to the data signal Vdata, and provide the driving current to the second light emitting element ED2 through the repair line RL1*a*. The second light emitting element ED2 may emit light by the driving current. Accordingly, the defect of the second pixel circuit PDC2 may be repaired by the dummy pixel circuit DC and the second transistor TR2. Accordingly, the display apparatus 1000 (see FIG. 1) with improved reliability may be provided.

According to some embodiments of the inventive concept, when the first subpixel PXr (see FIG. 6) is defective, the first transistor TR1 provided with the first initialization voltage AVINT1 may be electrically connected to the dummy pixel circuit DC, and when the second subpixel PXg (see FIG. 6) or the third subpixel PXb (see FIG. 6) is defective, the second transistor TR2 provided with the second initialization voltage AVINT2 may be electrically connected to the dummy pixel circuit DC. In other words, the initialization voltages AVINT1 and AVINT2 may be provided differently according to the type of the pixel. As a response speed of a first frame is improved, the initialization voltages AVINT1 and AVINT2 may be adjusted. When displaying an image, the display device 1000 may be adjusted so that the color coordinates is not concentrated on a specific color. Accordingly, the display device 1000 with improved display performance may be provided.

In addition, according to some embodiments of the inventive concept, one dummy pixel DP may be connected with the first initialization voltage line VL4-1 or the second initialization voltage line VL4-2 according to the repair process. Accordingly, one dummy pixel DP may be located in one pixel row composed of the plurality of pixels PX (see FIG. 3). Accordingly, the area of the first sub-dummy area DAa may be reduced. Accordingly, the display device 1000 (see FIG. 1) with a reduced area of the non-display area NDA (see FIG. 3) may be provided.

Figure 12:
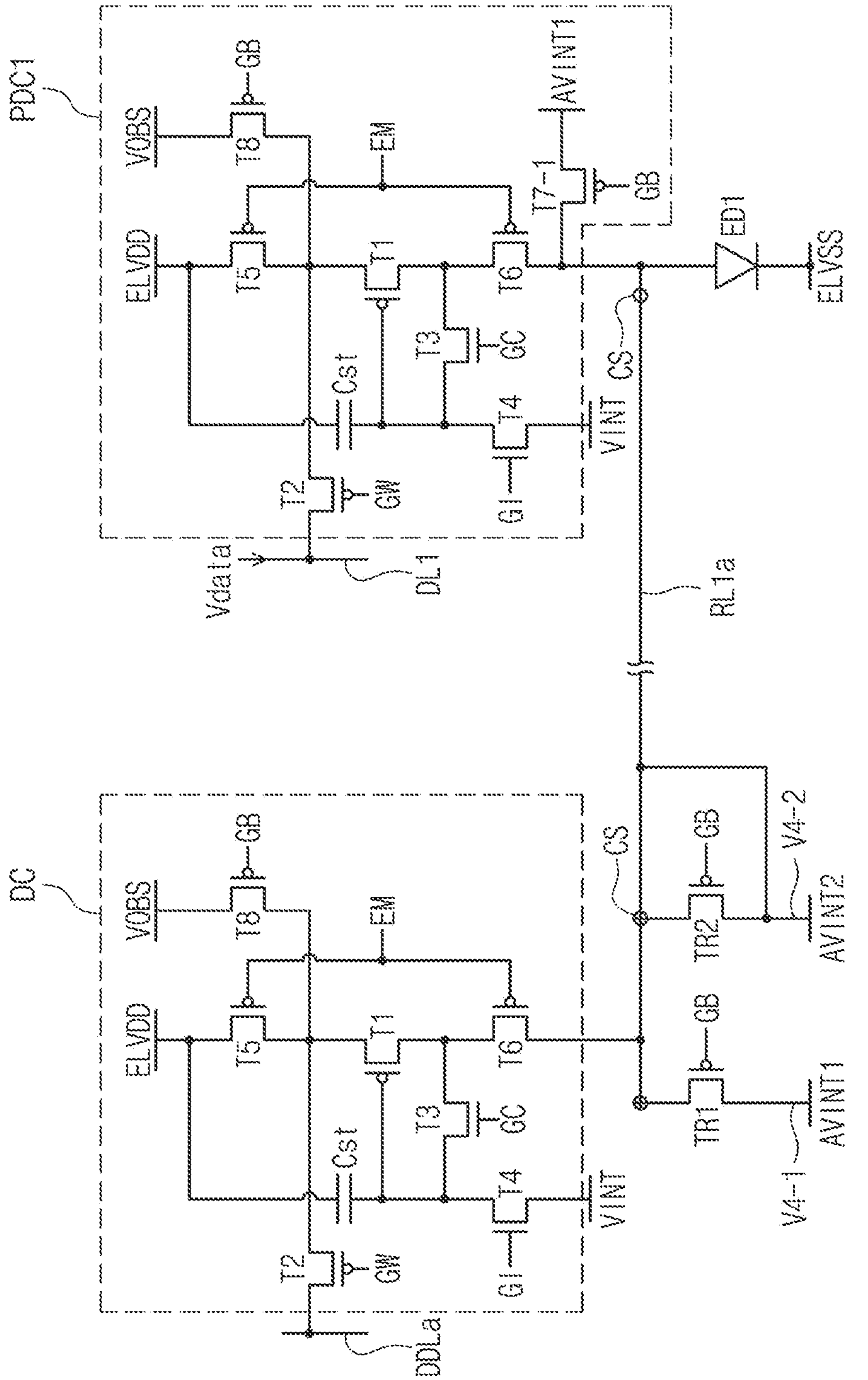
FIGS. 12 to 14 are pixel circuit diagrams showing one pixel and one dummy pixel according to some embodiments of the inventive concept.
Figure 13:
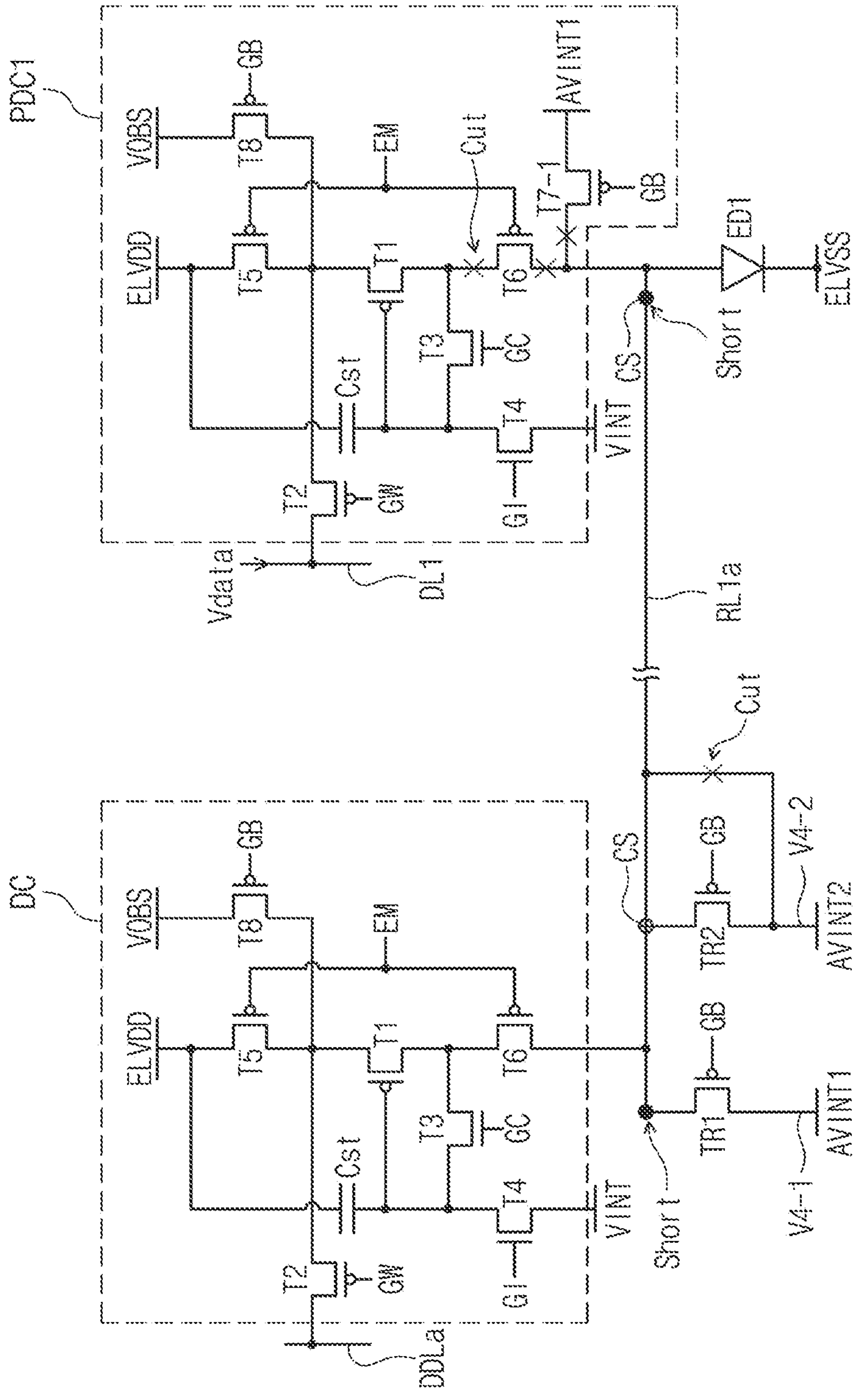
Figure 14:
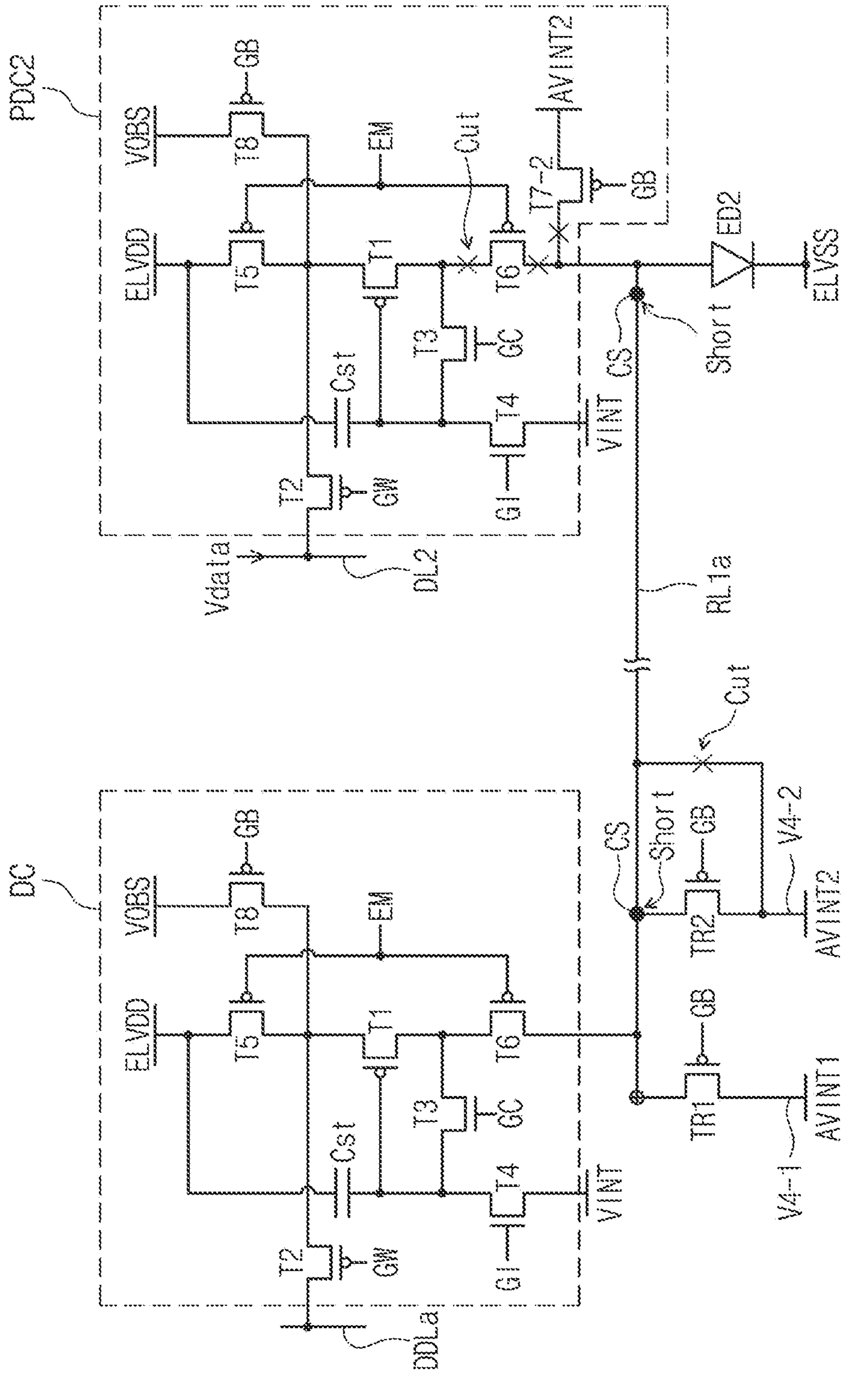

FIGS. 12 to 14 are pixel circuit diagrams showing one pixel and one dummy pixel according to some embodiments of the inventive concept. In descriptions about FIGS. 12 to 14, like reference numerals are used for like elements described with reference to FIGS. 4 and 6, and descriptions thereabout will be omitted.

FIG. 12 illustrates the first pixel circuit PDC1 in which a defect does not occur, and the dummy pixel DP (see FIG. 7).

Referring to FIG. 12, the first pixel circuit PDC1 and the anode of the first light emitting element ED1 may be arranged to be connectable with the repair line RL1*a* through the connectable structure CS.

The dummy pixel circuit DC may be electrically connected with the repair line RL1*a*.

The first transistor TR1 and the second transistor TR2 may be located adjacent to the dummy pixel circuit DC.

The repair line RL1*a* may be provided with the second initialization voltage AVINT2 and electrically connected with the second initialization voltage line V4-2. In the repair process, the repair line RL1*a* may be connected separably with the second initialization voltage line V4-2. However, this is an example, and the connection relationship with the repair line RL1*a* according to some embodiments of the inventive concept is not limited thereto. For example, the repair line RL1*a* may be electrically connected with the first initialization voltage line V4-1 through which the first initialization voltage AVINT1 is provided.

FIG. 13 illustrates a case where a defect occurs in the first pixel PXr (see FIG. 6).

Referring to FIG. 13, when the first pixel circuit PDC1 connected to the first scan line CL1 (see FIG. 7) and the first data line DL1 is defective, the anode of the first light emitting element ED1 may be electrically insulated from the first pixel circuit PDC1 and the second transistor TR2. The first electrode of the emission control transistor T6, the second electrode of the emission control transistor T6, and the second electrode of the first initialization transistor T7-1 may be separated from the anode of the first light emitting element ED1. For example, when the first electrode of the emission control transistor T6, the second electrode of the emission control transistor T6, and the first initialization transistor T7-1 are emitted with laser light and cut off, the defective first pixel circuit PDC1 may be electrically open-circuited from the first light emitting element ED1.

The laser light is emitted to and cuts off a line through which the repair line RL1*a* is connected with the second initialization voltage line V4-2.

The anode of the first light emitting element ED1 may be electrically connected with the first transistor TR1 through the connectable structure CS. The repair line RL1*a*, the dummy pixel circuit DC, and the first transistor TR1 may be connected with the anode of the first light emitting element ED1. For example, when the laser light is emitted to the connectable structure located between the anode of the first light emitting element ED1 and the first transistor TR1, the insulation films between the first and second conductors of the connectable structures CS is broken down to electrically short-circuit the first and second conductors.

The dummy pixel circuit DC and the first transistor TR1 may have the same circuit as the first pixel circuit PDC1 provided with the first initialization voltage AVINT1.

Here, the first dummy data line DDLa and the first data line DL1 may be electrically connected through the connectable structure CS (see FIG. 7). For example, when the laser light is emitted to the connectable structure CS (see FIG. 7) between the first dummy data line DDLa and the first data line DL1, the first dummy data line DDLa may be electrically short-circuited with the first data line DL1.

FIG. 14 illustrates a case where a defect occurs in the second pixel PXg (see FIG. 6). Alternatively, the repairing may also be identically applied to a case where the defect occurs in the third pixel PXb (see FIG. 6).

When the second pixel circuit PDC2 connected to the first scan line CL1 (see FIG. 7) and the second data line DL2 is defective, the anode of the second light emitting element ED2 may be electrically insulated from the second transistor PDC2 and the first transistor TR1. The first electrode of the emission control transistor T6, the second electrode of the emission control transistor T6, and the second electrode of the second initialization transistor T7-2 may be separated from the anode of the second light emitting element ED2. For example, when the first electrode of the emission control transistor T6, the second electrode of the emission control transistor T6, and the second electrode of the second initialization transistor T7-2 are emitted with laser light and cut off, the defective second pixel circuit PDC2 may be electrically open-circuited from the second light emitting element ED2.

The laser light is emitted to and cuts off the line through which the repair line RL1*a* is connected with the second initialization voltage line V4-2.

The anode of the second light emitting element ED2 may be electrically connected with the second transistor TR2 through the connectable structures CS. The repair line RL1*a*, the dummy pixel circuit DC, and the second transistor TR2 may be connected with the anode of the second light emitting element ED2. For example, when the laser light is emitted to the connectable structures located between the anode of the second light emitting element ED2, the dummy pixel circuit DC, and the second transistor TR2, the insulation films between the first and second conductors of the connectable structures CS are broken down to electrically short-circuit the first and second conductors.

The dummy pixel circuit DC and the second transistor TR2 may have the same circuit as the second pixel circuit PDC2 provided with the second initialization voltage AVINT2.

Here, the first dummy data line DDLa and the second data line DL2 may be electrically connected through the connectable structure CS (see FIG. 7). For example, when the laser light is emitted to the connectable structure CS (see FIG. 7) between the first dummy data line DDLa and the second data line DL2, the first dummy data line DDLa may be electrically short-circuited with the second data line DL2.

According to some embodiments of the inventive concept, when the first subpixel PXr (see FIG. 6) is defective, the first transistor TR1 provided with the first initialization voltage AVINT1 may be electrically connected to the dummy pixel circuit DC, and when second subpixel PXg (see FIG. 6) or the third subpixel PXb (see FIG. 6) is defective, the second transistor TR2 provided with the second initialization voltage AVINT2 may be electrically connected to the dummy pixel circuit DC. In other words, the initialization voltages AVINT1 and AVINT2 may be provided differently according to the type of the pixel. As a response speed of a first frame is improved, the initialization voltages AVINT1 and AVINT2 may be adjusted. When displaying an image, the display device 1000 may be adjusted so that the color coordinates is not concentrated on a specific color. Accordingly, the display device 1000 with improved display performance may be provided.

Figure 15:
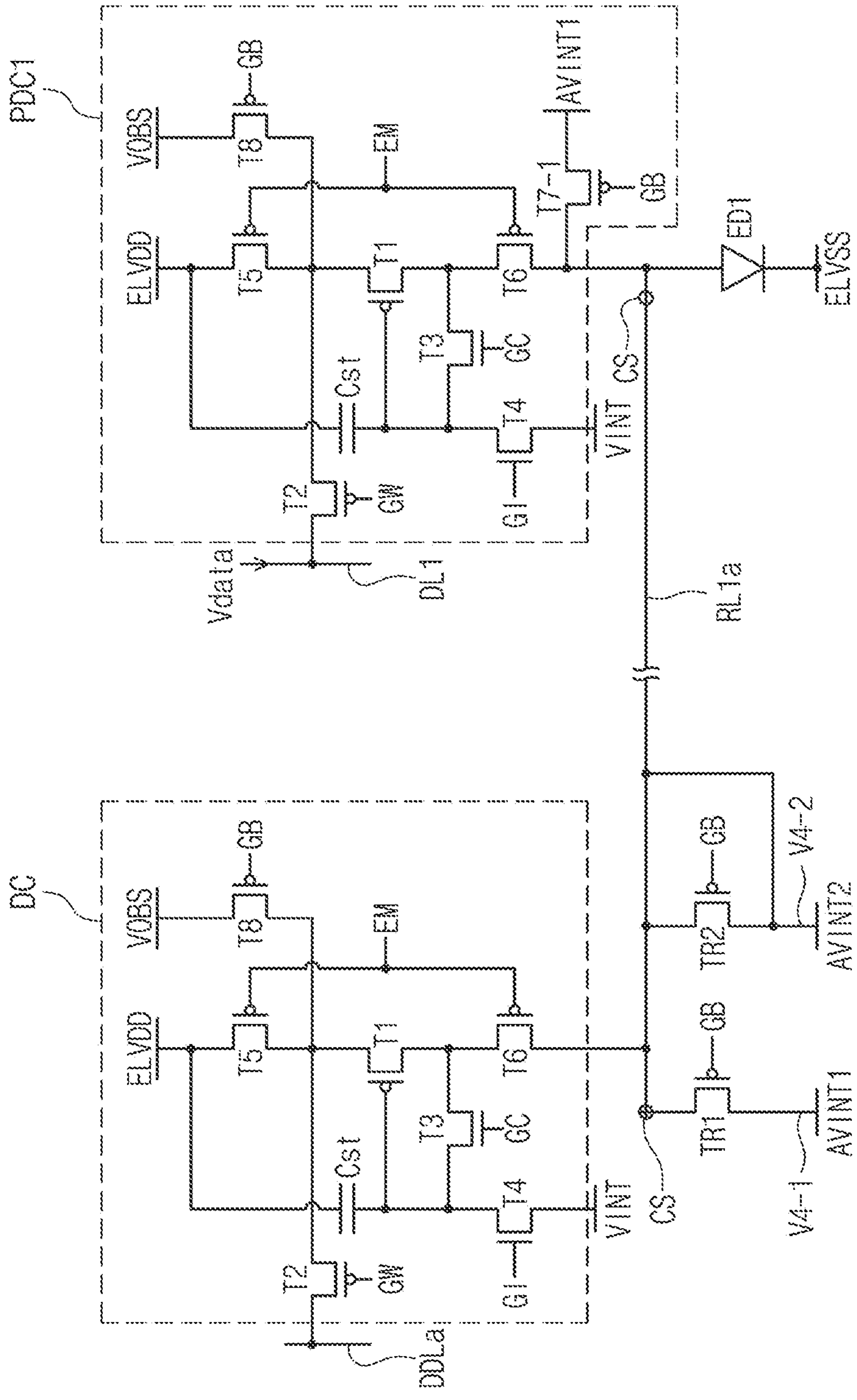
FIGS. 15 to 17 are pixel circuit diagrams showing one pixel and one dummy pixel according to some embodiments of the inventive concept.
Figure 16:
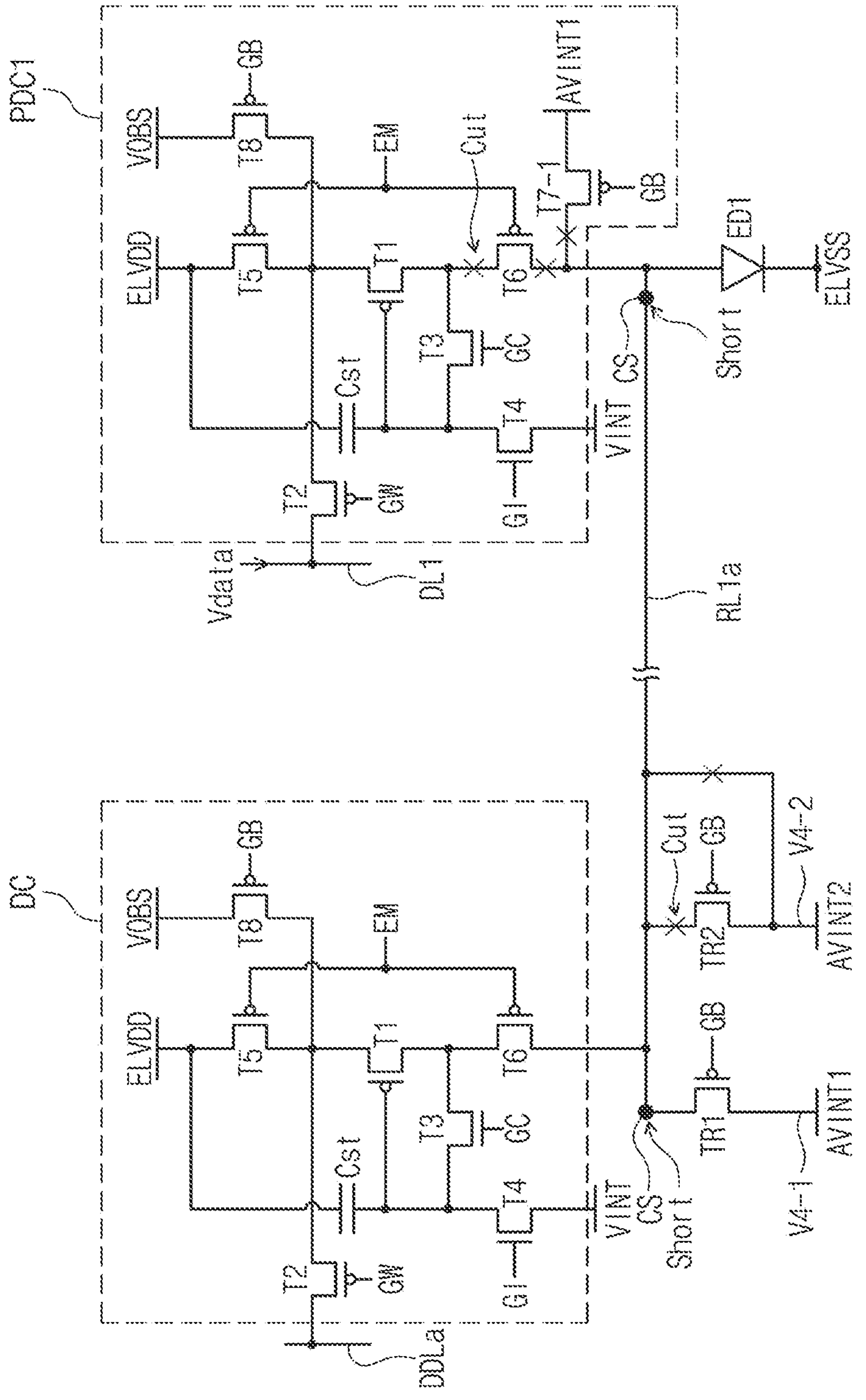
Figure 17:
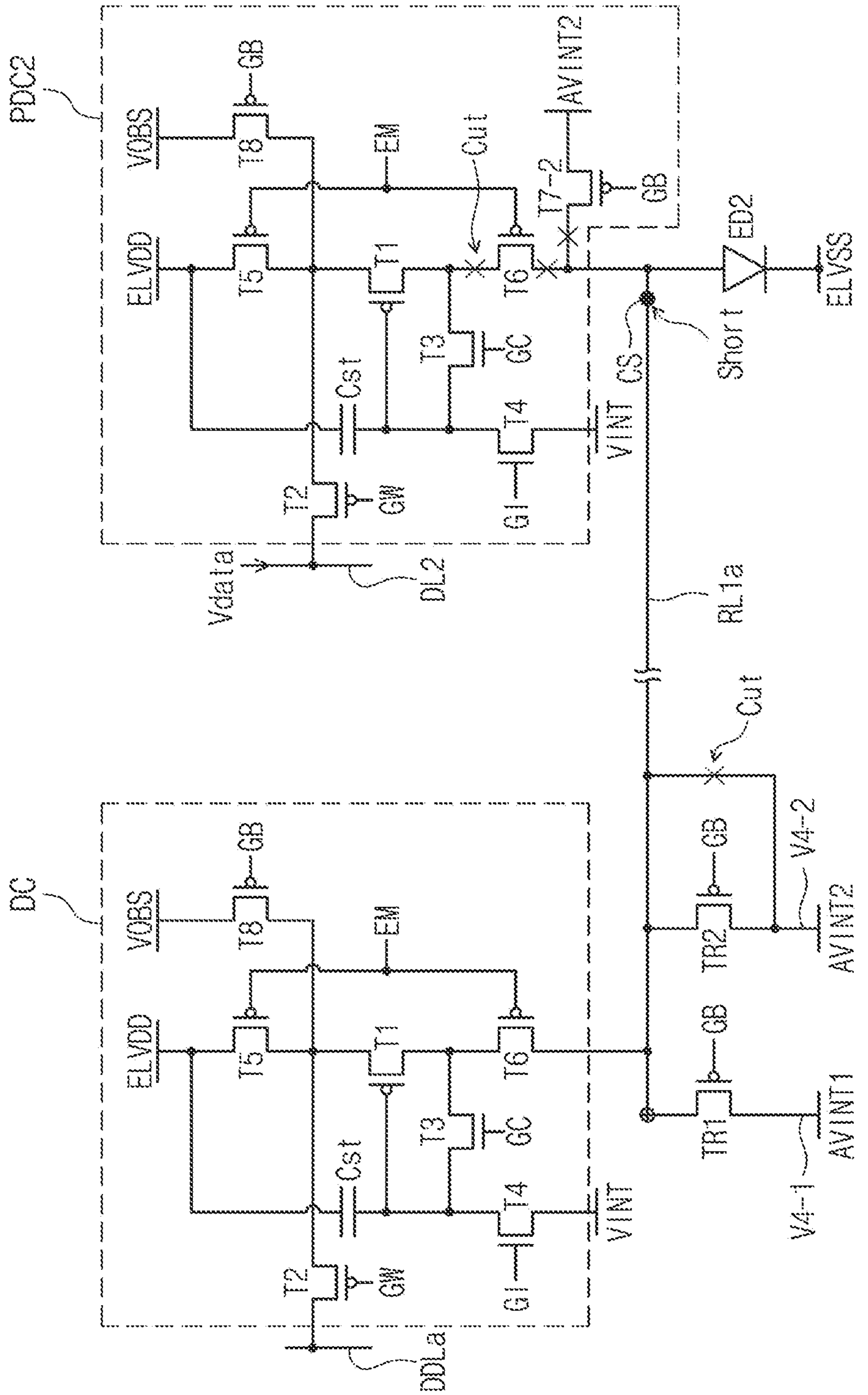

FIGS. 15 to 17 are pixel circuit diagrams showing one pixel and one dummy pixel according to some embodiments of the inventive concept. In description about FIGS. 15 to 17, like reference numerals are used for like elements described with reference to FIGS. 4 and 6, and descriptions thereabout will be omitted.

FIG. 15 illustrates the first pixel circuit PDC1 in which a defect does not occur and the dummy pixel DP (see FIG. 7).

Referring to FIG. 15, the first pixel circuit PDC1 and the anode of the first light emitting element ED1 may be arranged to be connectable with the repair line RL1*a* through the connectable structure CS.

The dummy pixel circuit DC may be electrically connected with the repair line RL1*a* and the second transistor TR2.

The first transistor TR1 and the second transistor TR2 may be located adjacent to the dummy pixel circuit DC.

The repair line RL1*a* may be provided with the second initialization voltage AVINT2 and electrically connected with the second initialization voltage line V4-2. In the repair process, the repair line RL1*a* may be connected separably with the second initialization voltage line V4-2. However, this is an example, and the connection relationship with the repair line RL1*a* according to some embodiments of the inventive concept is not limited thereto. For example, the repair line RL1*a* may be electrically connected with the first initialization voltage line V4-1 through which the first initialization voltage AVINT1 is provided.

FIG. 16 illustrates a case where a defect occurs in the first pixel PXr (see FIG. 6).

Referring to FIG. 16, when the first pixel circuit PDC1 connected to the first scan line CL1 (see FIG. 7) and the first data line DL1 is defective, the anode of the first light emitting element ED1 may be electrically insulated from the first pixel circuit PDC1 and the second transistor TR2. The first electrode of the emission control transistor T6, the second electrode of the emission control transistor T6, and the second electrode of the first initialization transistor T7-1 may be separated from the anode of the first light emitting element ED1. For example, when the first electrode of the emission control transistor T6, the second electrode of the emission control transistor T6, and the first initialization transistor T7-1 are emitted with laser light and cut off, the defective first pixel circuit PDC1 may be electrically open-circuited from the first light emitting element ED1.

The line connected with the repair line RL1*a* and the second initialization voltage line V4-2 and the line connected with the repair line RL1*a* and the second transistor TR2 are emitted with the laser light and cut off.

The anode of the first light emitting element ED1 may be electrically connected with the first transistor TR1 through the connectable structures CS. The repair line RL1*a*, the dummy pixel circuit DC, and the first transistor TR1 may be connected with the anode of the first light emitting element ED1. For example, when the laser light is emitted to the connectable structures CS located between the anode of the first light emitting element ED1 and the first transistor TR1, the insulation films between the first and second conductors of the connectable structures CS are broken down to electrically short-circuit the first and second conductors.

The dummy pixel circuit DC and the first transistor TR1 may have the same circuit as the first pixel circuit PDC1 provided with the first initialization voltage AVINT1.

Here, the first dummy data line DDLa and the first data line DL1 may be electrically connected through the connectable structure CS (see FIG. 7). For example, when the laser light is emitted to the connectable structure CS (see FIG. 7) between the first dummy data line DDLa and the first data line DL1, the first dummy data line DDLa may be electrically short-circuited with the first data line DL1.

FIG. 17 illustrates a case where a defect occurs in the first pixel PXr (see FIG. 6). Alternatively, the repairing may also be applied to a case where the defect occurs in the third pixel PXb (see FIG. 6).

Referring to FIG. 17, when the second pixel circuit PDC2 connected to the first scan line CL1 (see FIG. 7) and the second data line DL2 is defective, the anode of the second light emitting element ED2 may be electrically insulated from the second pixel circuit PDC2 and the first transistor TR1. The first electrode of the emission control transistor T6, the second electrode of the emission control transistor T6, and the second electrode of the second initialization transistor T7-2 may be separated from the anode of the second light emitting element ED2. For example, when the first electrode of the emission control transistor T6, the second electrode of the emission control transistor T6, and the second electrode of the second initialization transistor T7-2 are emitted with the laser light and cut off, the defective second pixel circuit PDC2 may be electrically open-circuited from the second light emitting element ED2.

The laser light is emitted to and cuts off the line through which the repair line RL1*a* is connected with the second initialization voltage line V4-2.

The anode of the second light emitting element ED2 may be electrically connected with the second transistor TR2 through the connectable structure CS. The repair line RL1*a*, the dummy pixel circuit DC, and the second transistor TR2 may be connected with the anode of the second light emitting element ED2. For example, when the connectable structure CS connected to the anode of the second light emitting element ED2 is emitted with the laser light, the insulation film between the first and second conductors of the connectable structure CS is broken down to short-circuit the first and second conductors.

The dummy pixel circuit DC and the second transistor TR2 may have the same circuit as the second pixel circuit PDC2 provided with the second initialization voltage AVINT2.

Here, the first dummy data line DDLa and the second data line DL2 may be electrically connected through the connectable structure CS (see FIG. 7). For example, when the laser light is emitted to the connectable structure CS (see FIG. 7) between the first dummy data line DDLa and the second data line DL2, the first dummy data line DDLa may be electrically short-circuited with the second data line DL2.

According to some embodiments of the inventive concept, when the first subpixel PXr (see FIG. 6) is defective, the first transistor TR1 provided with the first initialization voltage AVINT1 may be electrically connected to the dummy pixel circuit DC, and when the second subpixel PXg (see FIG. 6) or the third subpixel PXb (see FIG. 6) is defective, the second transistor TR2 provided with the second initialization voltage AVINT2 may be electrically connected to the dummy pixel circuit DC. In other words, the initialization voltages AVINT1 and AVINT2 may be provided differently according to the type of the pixel. As a response speed of a first frame is improved, the initialization voltages AVINT1 and AVINT2 may be adjusted. When displaying an image, the display device 1000 may be adjusted so that the color coordinates is not concentrated on a specific color. Accordingly, the display device 1000 with improved display performance may be provided.

Figure 18:
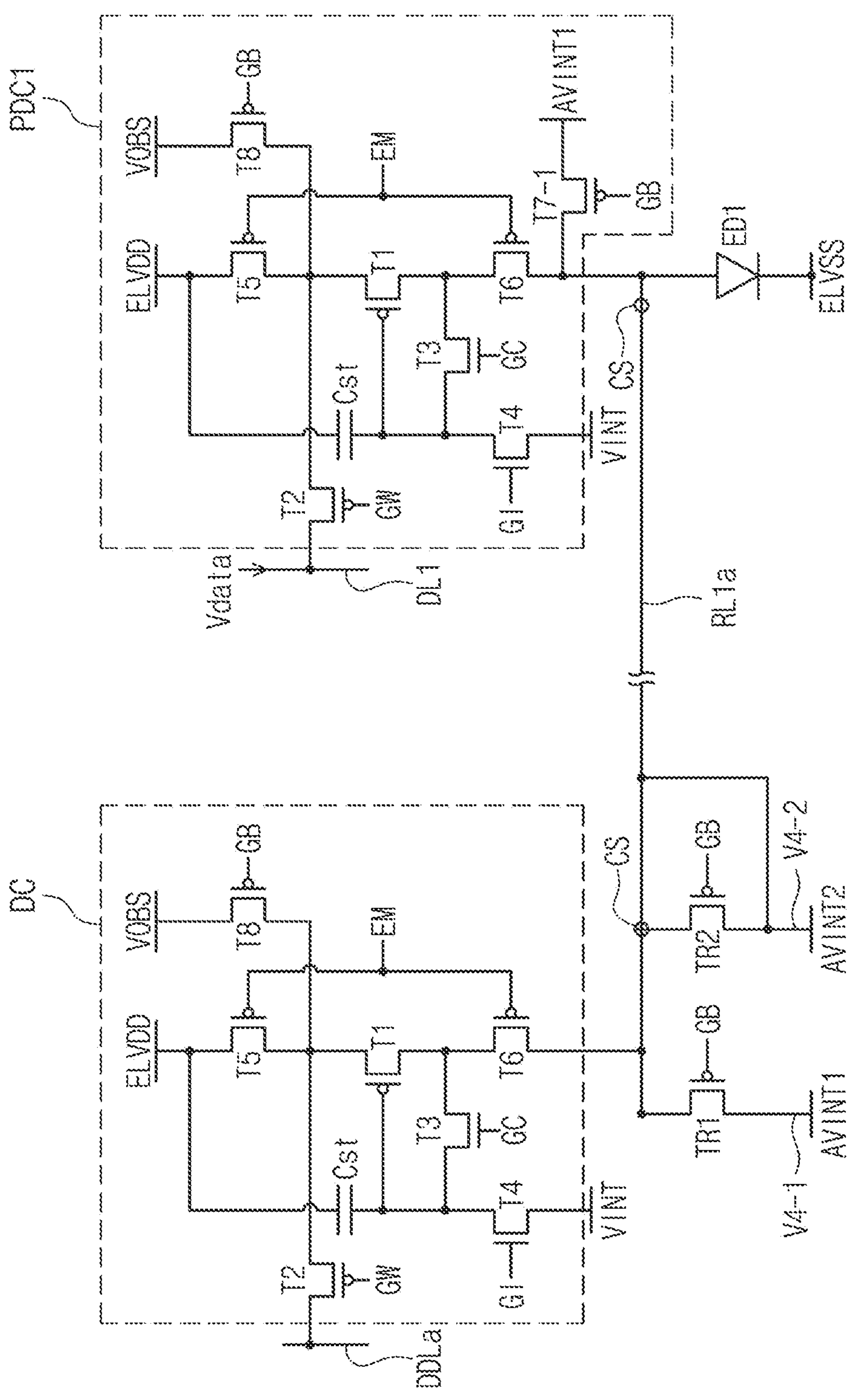
FIGS. 18 to 20 are pixel circuit diagrams showing one pixel and one dummy pixel according to some embodiments of the inventive concept.
Figure 19:
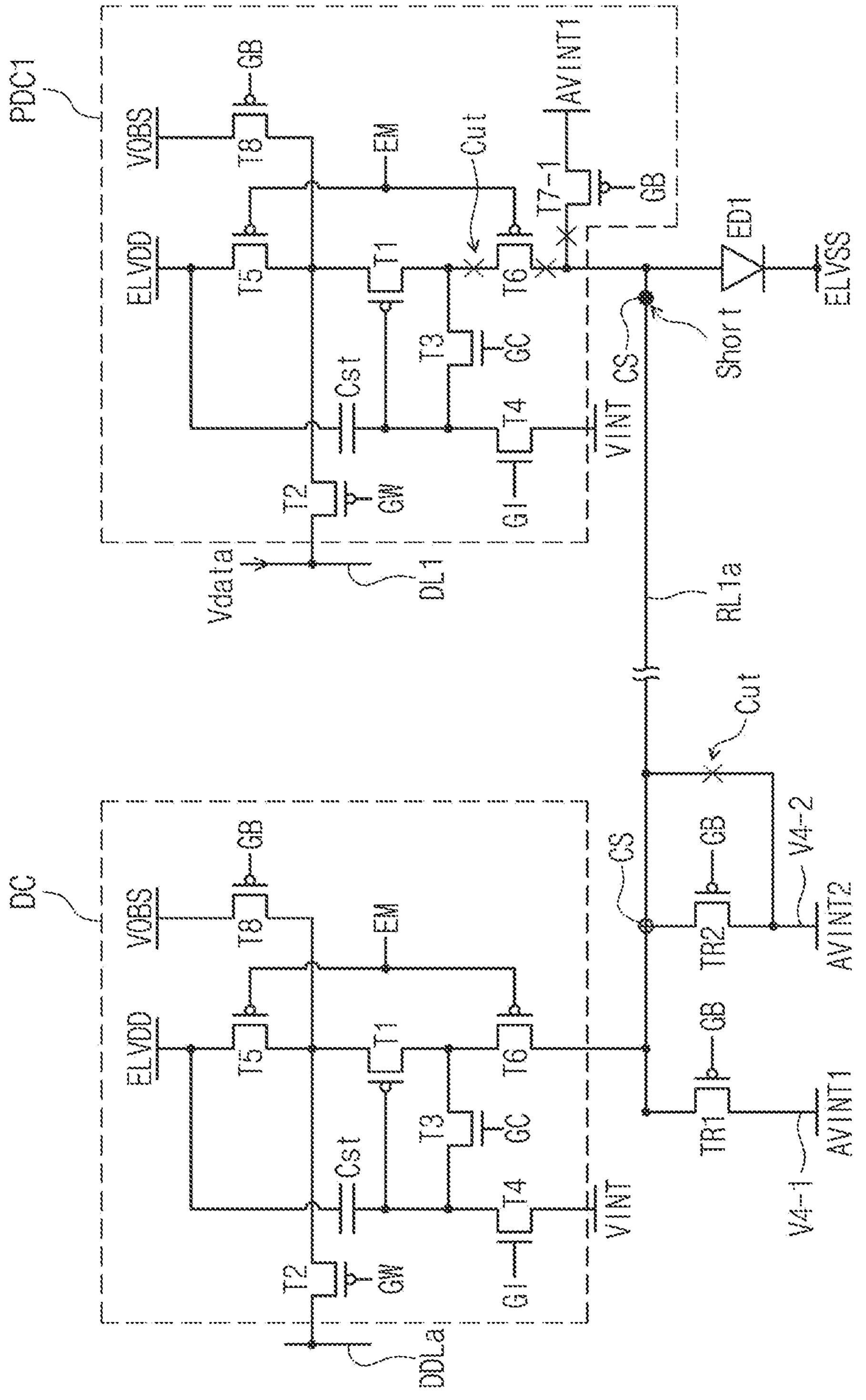
Figure 20:
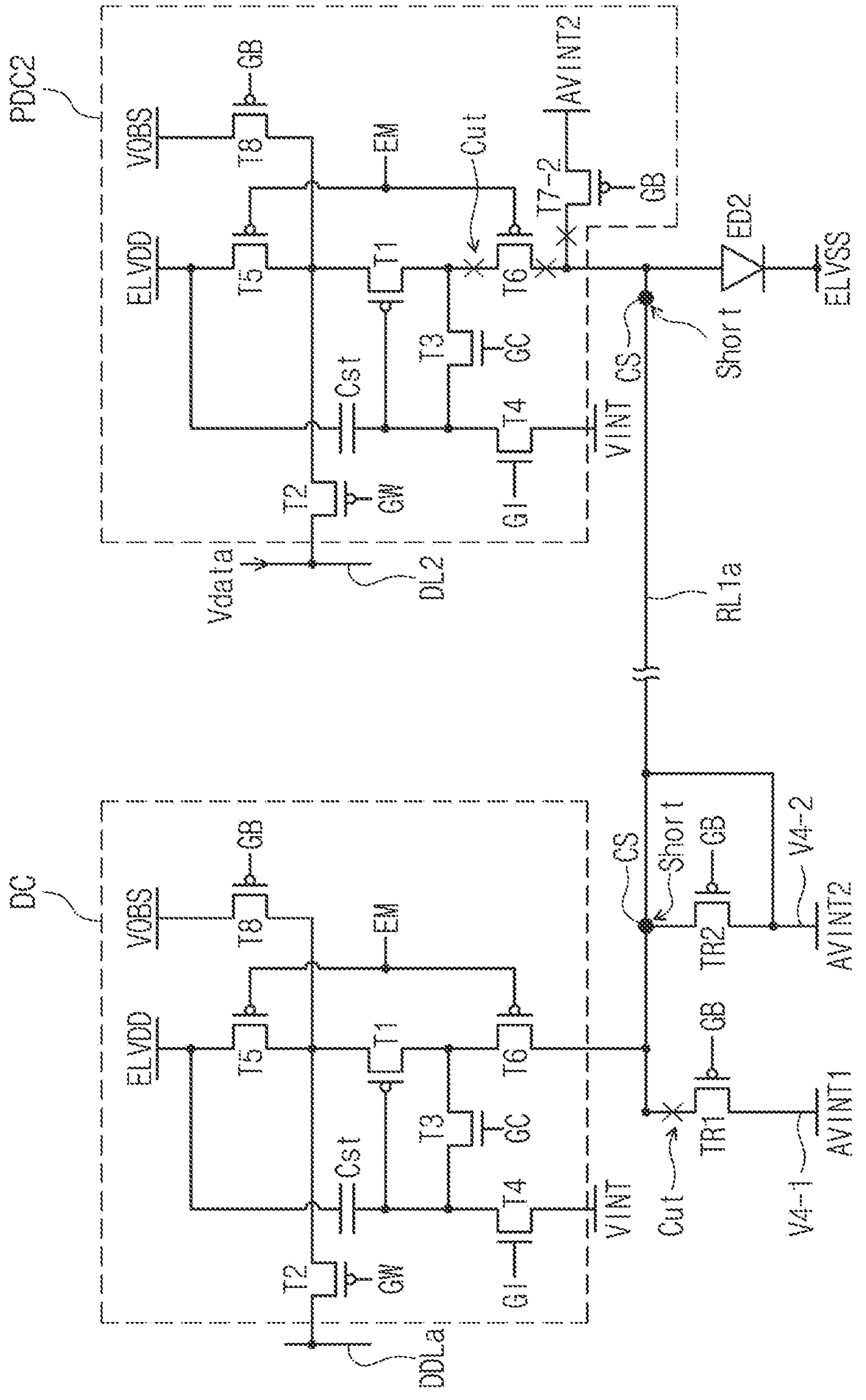

FIGS. 18 to 20 are pixel circuit diagrams showing one pixel and one dummy pixel according to some embodiments of the inventive concept. In description about FIGS. 18 to 20, like reference numerals are used for like elements described with reference to FIGS. 4 and 6, and descriptions thereabout will be omitted.

FIG. 18 illustrates the first pixel circuit PDC1 in which a defect does not occur and the dummy pixel DP (see FIG. 7).

Referring to FIG. 18, the first pixel circuit PDC1 and the anode of the first light emitting element ED1 may be arranged to be connectable with the repair line RL1*a* through the connectable structure CS.

The dummy pixel circuit DC may be electrically connected with the repair line RL1*a* and the first transistor TR1.

The first transistor TR1 and the second transistor TR2 may be located adjacent to the dummy pixel circuit DC.

The repair line RL1*a* may be electrically connected with the second initialization voltage line V4-2 through which the second initialization voltage AVINT2 is provided. In the repair process, the repair line RL1*a* may be connected separably with the second initialization voltage line V4-2. However, this is an example, and the connection relationship with the repair line RL1*a* according to some embodiments of the inventive concept is not limited thereto. For example, the repair line RL1*a* may be electrically connected with the first initialization voltage line V4-1 through which the first initialization voltage AVINT1 is provided.

FIG. 19 illustrates a case where a defect occurs in the first pixel PXr (see FIG. 6).

Referring to FIG. 19, when the first pixel circuit PDC1 connected to the first scan line CL1 (see FIG. 7) and the first data line DL1 is defective, the anode of the first light emitting element ED1 may be electrically insulated from the first pixel circuit PDC1 and the second transistor TR2. The first electrode of the emission control transistor T6, the second electrode of the emission control transistor T6, and the second electrode of the first initialization transistor T7-1 may be separated from the anode of the first light emitting element ED1. For example, when the first electrode of the emission control transistor T6, the second electrode of the emission control transistor T6, and the first initialization transistor T7-1 are emitted with laser light and cut off, the defective first pixel circuit PDC1 may be electrically open-circuited from the first light emitting element ED1.

A line connected with the repair line RL1*a* and the second initialization voltage line V4-2 and the line connected with the repair line RL1*a* and the second transistor TR2 are emitted with the laser light and cut off.

The anode of the first light emitting element ED1 may be electrically connected with the first transistor TR1 through the connectable structures CS. The repair line RL1*a*, the dummy pixel circuit DC, and the first transistor TR1 may be connected with the anode of the first light emitting element ED1. For example, when the connectable structure CS connected to the anode of the first light emitting element ED1 is emitted with the laser light, the insulation film between first and second conductors of the connectable structure CS is broken down to short-circuit the first and second conductors short-circuited with each other.

The dummy pixel circuit DC and the first transistor TR1 may have the same circuit as the first pixel circuit PDC1 provided with the first initialization voltage AVINT1.

Here, the first dummy data line DDLa and the first data line DL1 may be electrically connected through the connectable structure CS (see FIG. 7). For example, when the laser light is emitted to the connectable structure CS (see FIG. 7) between the first dummy data line DDLa and the first data line DL1, the first dummy data line DDLa may be electrically short-circuited with the first data line DL1.

FIG. 20 illustrates a case where a defect occurs in the first pixel PXr (see FIG. 6). Alternatively, the repairing may also be applied to a case where the defect occurs in the third pixel PXb (see FIG. 6).

Referring to FIG. 20, when the second pixel circuit PDC2 connected to the first scan line CL1 (see FIG. 7) and the second data line DL2 is defective, the anode of the second light emitting element ED2 may be electrically insulated from the second pixel circuit PDC2 and the first transistor TR1. The first electrode of the emission control transistor T6, the second electrode of the emission control transistor T6, and the second electrode of the second initialization transistor T7-2 may be separated from the anode of the second light emitting element ED2. For example, when the first electrode of the emission control transistor T6, the second electrode of the emission control transistor T6, and the second electrode of the second initialization transistor T7-2 are emitted with laser light and cut off, the defective second pixel circuit PDC2 may be electrically open-circuited from the second light emitting element ED2.

The laser light is emitted to and cuts the line through which the repair line RL1*a* is connected with the second initialization voltage line V4-2.

The anode of the second light emitting element ED2 may be electrically connected with the second transistor TR2 through the connectable structures CS. The repair line RL1*a*, the dummy pixel circuit DC, and the second transistor TR2 may be connected with the anode of the second light emitting element ED2. For example, when the laser light is emitted to the connectable structure connected to the anode of the second light emitting element ED2 and the second transistor TR2, the insulation films between the first and second conductors of the connectable structures CS are broken down to short-circuit the first and second conductors electrically.

The dummy pixel circuit DC and the second transistor TR2 may have the same circuit as the second pixel circuit PDC2 provided with the second initialization voltage AVINT2.

Here, the first dummy data line DDLa and the second data line DL2 may be electrically connected through the connectable structure CS (see FIG. 7). For example, when the laser light is emitted to the connectable structure CS (see FIG. 7) between the first dummy data line DDLa and the second data line DL2, the first dummy data line DDLa may be electrically short-circuited with the second data line DL2.

According to some embodiments of the inventive concept, when the first subpixel PXr (see FIG. 6) is defective, the first transistor TR1 provided with the first initialization voltage AVINT1 may be electrically connected to the dummy pixel circuit DC, and when second subpixel PXg (see FIG. 6) or the third subpixel PXb (see FIG. 6) is defective, the second transistor TR2 provided with the second initialization voltage AVINT2 may be electrically connected to the dummy pixel circuit DC. In other words, the initialization voltages AVINT1 and AVINT2 may be provided differently according to the type of the pixel. As the response speed of a first frame is improved, the initialization voltages AVINT1 and AVINT2 may be adjusted. When displaying an image, the display device 1000 may be adjusted so that the color coordinates is not concentrated on a specific color. Accordingly, the display device 1000 with improved display performance may be provided.

According to some embodiments of the inventive concept, each of the plurality of dummy pixels may include a first transistor electrically connected with a first initialization voltage line, and a second transistor electrically connected with a second initialization voltage line. In other words, one dummy pixel may be connected with the first initialization voltage line or the second initialization voltage line according to a repair process. Accordingly, the one dummy pixel may be located in one pixel row composed of a plurality of pixels. Accordingly, the area of a first sub-dummy area may be reduced. Therefore, a display device in which the area of the non-display area is reduced may be provided.

In addition, according to the above description, when a first sub-pixel is defective, the first transistor with the first initialization voltage provided is electrically connected to the dummy pixel circuit, and when a second sub-pixel or a third sub-pixel is defective, the second transistor with the second initialization voltage provided may be electrically connected to the dummy pixel circuit. In other words, the initialization voltage may be provided differently according to the kind of the pixel. The initialization voltage may be adjusted so as to improve a response speed of a first frame. When displaying an image, the display device may be adjusted so that the color coordinates are not concentrated on a specific color. Accordingly, the display device with improved display performance may be provided.

Although various embodiments of the present invention have been described, it is understood that various changes and modifications can be made by one ordinary skilled in the art within the spirit and scope of the present invention as hereinafter claimed. Therefore, the technical scope of the present invention should not be limited to the contents described in the detailed description of the specification, but should be defined by the claims, and their equivalents.

What is claimed is:

1. A display device comprising:
- a plurality of pixels in a display area;
- a dummy pixel in a dummy area adjacent to the display area; and
- a repair line connectable with the dummy pixel and each of the plurality of pixels,
- wherein the plurality of pixels comprise:
- a first subpixel comprising a first pixel circuit connected with a first initialization voltage line configured to provide a first initialization voltage, and a first light emitting element adjacent to the first pixel circuit and configured to emit first light; and
- a second subpixel comprising a second pixel circuit connected with a second initialization voltage line configured to provide a second initialization voltage different from the first initialization voltage, and a second light emitting element adjacent to the second pixel circuit and configured to emit second light different from the first light, and
- wherein the dummy pixel comprises:
- a first transistor connectable with the repair line and connected with the first initialization voltage line;
- a second transistor connectable with the repair line and connected with the second initialization voltage line; and
- a dummy pixel circuit connectable with the repair line.

2. The display device of claim 1, wherein the repair line is connected with the second initialization voltage line.

3. The display device of claim 1, wherein each of the first pixel circuit, the second pixel circuit, and the dummy pixel circuit comprises:
- a driving transistor connected between the first light emitting element and a driving voltage line configured to receive a driving voltage;

a switching transistor connected between a data line and a first electrode of the driving transistor, and configured to receive a first scan signal;

a compensation transistor connected between a second electrode of the driving transistor and a first node, and configured to receive a compensation scan signal; and an initialization transistor connected between the first node and an initialization voltage line provided with an initialization voltage, and configured to receive an initialization scan signal, the first pixel circuit further comprises a first initialization transistor connected between the first initialization voltage line and an anode of the first light emitting element, and configured to receive a second scan signal, and the second pixel circuit further comprises a second initialization transistor connected between the second initialization voltage line and an anode of the second light emitting element, and configured to receive the second scan signal.

4. The display device of claim 3, wherein the driving transistor, the switching transistor, the first initialization transistor, the second initialization transistor, the first transistor, and the second transistor are P-type transistors, and the compensation transistor and the initialization transistor are N-type transistors.

5. The display device of claim 1, wherein the dummy area is provided in plural, and the plurality of dummy areas are spaced apart from each other with the display area interposed therebetween.

6. The display device of claim 1, wherein, in response to the first pixel circuit being defective, an anode of the first light emitting element is electrically connected with the dummy pixel circuit and the first transistor, and the anode of the first light emitting element is insulated from the first pixel circuit and the second transistor.

7. The display device of claim 1, wherein, in response to the second pixel circuit being defective, an anode of the second light emitting element is electrically connected with the dummy pixel circuit and the second transistor, and the anode of the second light emitting element is insulated from the second pixel circuit and the first transistor.

8. The display device of claim 1, wherein the first light is red light, and the second light is blue light or green light.

9. The display device of claim 1, wherein the first initialization voltage has a lower level than the second initialization voltage.

10. The display device of claim 1, wherein the plurality of pixels and the dummy pixel are arranged in a first direction.

11. The display device of claim 1, wherein the first transistor and the second transistor are adjacent to the dummy pixel circuit.

12. A display device repair method comprising:

providing a display device comprising a plurality of pixels, a dummy pixel, and a repair line adjacent to the dummy pixel and each of the plurality of pixels;

detecting a defect of each of the plurality of pixels; and repairing at least one of the plurality of pixels, wherein the plurality of pixels comprise:

a first subpixel comprising a first pixel circuit connected with a first initialization voltage line configured to provide a first initialization voltage, and a first light emitting element adjacent to the first pixel circuit and configured to emit first light; and a second subpixel comprising a second pixel circuit connected with a second initialization voltage line configured to provide a second initialization voltage different from the first initialization voltage, and a second light emitting element adjacent to the second pixel circuit and configured to emit second light different from the first light, and wherein the dummy pixel comprises:

a first transistor connectable with the repair line and connected with the first initialization voltage line;

a second transistor connectable with the repair line and connected with the second initialization voltage line; and a dummy pixel circuit connectable with the repair line.

13. The display device repair method of claim 12, wherein the repair line is connected with the second initialization voltage, and the repairing at least one of the plurality of pixels comprises open-circuiting the repair line and the second initialization voltage line, in response to one of the plurality of pixels being defective.

14. The display device repair method of claim 12, wherein, in providing a display device, the repair line is adjacent to the dummy pixel circuit, the first transistor, the second transistor, the first subpixel, and the second subpixel, and is open-circuited therefrom, and in response to the first pixel being determined to be defective in the detecting a defect of each of the plurality of pixels, repairing at least one of the plurality of pixels comprises repairing the first subpixel, wherein repairing the first subpixel comprises:

electrically open-circuiting the first subpixel circuit from the first light emitting element; and electrically short-circuiting the repair line with the dummy pixel circuit, the first transistor, and the first light emitting element.

15. The display device repair method of claim 14, wherein, in response to the second subpixel being determined to be defective in the detecting a defect of each of the plurality of pixels, repairing comprises repairing the second subpixel, wherein repairing the second subpixel comprises:

electrically open-circuiting the second pixel circuit from the second light emitting element; and electrically short-circuiting the repair line with the dummy pixel circuit, the second transistor, and the second light emitting element.

16. The display device repair method of claim 14, wherein each of the first pixel circuit and the second pixel circuit comprises:

a driving transistor connected between the first light emitting element and a driving voltage line configured to receive a driving voltage;

a switching transistor connected between a data line and a first electrode of the driving transistor, and configured to receive a first scan signal;

a compensation transistor connected between and a first node and a second electrode of the driving transistor, and configured to receive a compensation scan signal; and an initialization transistor connected between the first node and an initialization voltage line provided with an initialization voltage, and configured to receive an initialization scan signal, the first pixel circuit further comprises a first initialization transistor connected between the first initialization voltage line and an anode of the first light emitting element, and configured to receive a second scan signal, the second pixel circuit further comprises a second initialization transistor connected between the second initialization voltage line and an anode of the second light emitting element, and configured to receive the second scan signal, and wherein the electrically open-circuiting the first pixel circuit from the first light emitting element comprises:

short-circuiting the driving transistor, the compensation transistor, and the first light emitting element; and short-circuiting the first light emitting element and the first initialization transistor.

17. The display device repair method of claim 12, wherein, in the providing a display device, the repair line is electrically connected with the dummy pixel circuit, and the repair line is adjacent to each of the first transistor, the second transistor, the first subpixel and the second pixel and is open-circuited therefrom, and in response to the first subpixel being determined to be defective in the detecting a defect of each of the plurality of pixels, repairing at least one of the plurality of pixels comprises:

electrically open-circuiting the first subpixel circuit from the first light emitting element; and electrically short-circuiting the repair line with the first transistor and the first light emitting element.

18. The display device repair method of claim 17, wherein, in response to the second subpixel being determined to be defective in the detecting a defect of each of the plurality of pixels, repairing at least one of the plurality of pixels comprises:

electrically open-circuiting the second pixel circuit from the second light emitting element electrically open-circuited; and electrically short-circuiting the repair line with the first transistor and the first light emitting element.

19. The display device repair method of claim 12, wherein, in providing a display device, the repair line is electrically connected with the dummy pixel circuit and the second transistor, and the repair line is adjacent to each of the first transistor, the first subpixel, and the second subpixel and is electrically isolated open-circuited therefrom, in response to the first subpixel being determined to be defective in the detecting of a defect of each of the plurality of pixels, repairing at least one of the plurality of pixels comprises:

electrically open-circuiting the first pixel circuit from the first light emitting element;

electrically open-circuiting the repair line from the second transistor open-circuited; and electrically short-circuiting the repair line with the first transistor and the first light emitting element, and in response to the second subpixel being determined to be defective in the detecting a defect of each of the plurality of pixels, repairing at least one of the plurality of pixels comprises:

electrically open-circuiting the second pixel circuit from the second light emitting element; and electrically short-circuiting the repair line with the second light emitting element.

20. The display device repair method of claim 12, wherein, in providing a display device, the repair line is electrically connected with the dummy pixel circuit and the first transistor, and the repair line is adjacent to each of the second transistor, a first subpixel, and the second subpixel, and is open-circuited therefrom, in response to the first subpixel being determined to be defective in the detecting a defect of each of the plurality of pixels, repairing at least one of the plurality of pixels comprises:

electrically open-circuiting the first pixel circuit from the first light emitting element; and electrically short-circuiting the repair line with the first light emitting element, and in response to the second subpixel being determined to be defective in the detecting a defect of each of the plurality of pixels, repairing at least one of the plurality of pixels comprises:

electrically open-circuiting the second pixel circuit from the second light emitting element;

electrically open-circuiting the repair line from the first transistor; and electrically short-circuiting the repair line with the second transistor and the second light emitting element.

* * * * *